United States Patent
Marda et al.

(10) Patent No.: US 10,706,278 B2
(45) Date of Patent: Jul. 7, 2020

(54) SYNCING DIGITAL AND PHYSICAL DOCUMENTS

(71) Applicant: Adobe Inc., San Jose, CA (US)

(72) Inventors: Vikas Marda, Noida (IN); Roshni Sheikh, Noida (IN); Kartik Sachan, Noida (IN); Aman Singhal, Bangalore (IN)

(73) Assignee: ADOBE INC., San Jose, CA (US)

( * ) Notice: Subject to any disclaimer, the term of this patent is extended or adjusted under 35 U.S.C. 154(b) by 160 days.

(21) Appl. No.: 15/650,089

(22) Filed: Jul. 14, 2017

(65) Prior Publication Data

US 2019/0019022 A1    Jan. 17, 2019

(51) Int. Cl.
| | |
|---|---|
| *G06K 9/00* | (2006.01) |
| *G06Q 10/10* | (2012.01) |
| *G06K 9/46* | (2006.01) |
| *G06T 19/00* | (2011.01) |
| *G06F 16/93* | (2019.01) |
| *G06T 11/60* | (2006.01) |
| *G06K 9/22* | (2006.01) |

(52) U.S. Cl.
CPC ......... *G06K 9/00483* (2013.01); *G06F 16/93* (2019.01); *G06K 9/00456* (2013.01); *G06K 9/22* (2013.01); *G06K 9/4685* (2013.01); *G06Q 10/10* (2013.01); *G06T 11/60* (2013.01); *G06T 19/006* (2013.01); *G06T 2207/20221* (2013.01); *G06T 2207/30176* (2013.01); *G06T 2219/004* (2013.01)

(58) Field of Classification Search
None
See application file for complete search history.

(56) References Cited

U.S. PATENT DOCUMENTS

| | | | |
|---|---|---|---|
| 2002/0138476 A1* | 9/2002 | Suwa | G06K 9/00456 |
| 2005/0078871 A1* | 4/2005 | Pollard | G06F 3/0425 |
| | | | 382/219 |

(Continued)

OTHER PUBLICATIONS

Adams Bodomo, Mei-ling Lam, and Carmen Lee. 2003. Some students still read books in the 21st century: A study of user preferences for print and electronic libraries. The Reading Matrix 3, 3 (2003).

(Continued)

*Primary Examiner* — Kim Y Vu
*Assistant Examiner* — Nathan J Bloom
(74) *Attorney, Agent, or Firm* — Keller Jolley Preece

(57) ABSTRACT

Methods and systems for incorporating physical documents into a document review workflow involving electronic documents. One or more embodiments detect a presence of a physical document within a field of view of an AR device and map the physical document to an existing electronic document based on visual features of the physical document. Additionally, one or more embodiments determine at least one difference between the physical document and the electronic document and create, for the physical document and the electronic document a shared state mapping including the difference(s). One or more embodiments then apply the difference to the physical document or the electronic document by displaying the difference(s) in an AR layer within the field of view of the AR device or storing the difference(s) in the electronic document.

20 Claims, 12 Drawing Sheets

(56) References Cited

U.S. PATENT DOCUMENTS

| | | | | |
|---|---|---|---|---|
| 2005/0138382 | A1* | 6/2005 | Hougaard | G06Q 10/10 |
| | | | | 713/176 |
| 2005/0268217 | A1* | 12/2005 | Garrison | G06F 40/174 |
| | | | | 715/234 |
| 2008/0177764 | A1* | 7/2008 | Kise | G06K 9/00442 |
| 2010/0329555 | A1* | 12/2010 | Chapman | G06K 9/033 |
| | | | | 382/167 |
| 2011/0249299 | A1* | 10/2011 | Wu | G06K 9/2063 |
| | | | | 358/3.26 |
| 2012/0105487 | A1* | 5/2012 | Son | G06F 3/0487 |
| | | | | 345/671 |
| 2014/0253701 | A1* | 9/2014 | Wexler | A61F 9/08 |
| | | | | 348/62 |
| 2015/0325051 | A1* | 11/2015 | Bhuruth | G06T 19/006 |
| | | | | 345/633 |
| 2016/0049010 | A1* | 2/2016 | Hinski | G06K 9/00442 |
| | | | | 345/633 |
| 2017/0116784 | A1* | 4/2017 | Hintermeister | G06T 19/006 |
| 2018/0139204 | A1* | 5/2018 | Votaw | H04L 63/0861 |
| 2019/0043302 | A1* | 2/2019 | Lyons | G07F 17/3204 |

OTHER PUBLICATIONS

François Guimbretière. 2003. Paper augmented digital documents. In Proceedings of the 16th annual ACM symposium on User interface software and technology. ACM, 51-60.

David Holman, Roel Vertegaal, Mark Altosaar, Nikolaus Troje, and Derek Johns. 2005. Paper windows: interaction techniques for digital paper. In Proceedings of the SIGCHI conference on Human factors in computing systems. ACM, 591-599.

Konstantin Klamka and Raimund Dachselt. 2017. IllumiPaper: Illuminated interactive paper. In Proceedings of the 2017 CHI Conference on Human Factors in Computing Systems. ACM, 5605— 5618.

Zhen Li, Michelle Annett, Ken Hinckley, Karan Singh, and Daniel Wigdor. 2019. HoloDoc: Enabling Mixed Reality Workspaces that Harness Physical and Digital Content. In Proceedings of the 2019 CHI Conference on Human Factors in Computing Systems. ACM, 687.

Chunyuan Liao, Qiong Liu, Bee Liew, and Lynn Wilcox. 2010. Pacer: fine-grained interactive paper via camera-touch hybrid gestures on a cell phone. In Proceedings of the SIGCHI Conference on Human Factors in Computing Systems. ACM, 2441-2450.

Muhammad Pu, Nazatul Aini Abd Majid, and Bahari Idrus. 2017. Framework based on Mobile Augmented Reality for Translating Food Menu in Thai Language to Malay Language. International Journal on Advanced Science, Engineering and Information Technology 7, 1 (2017), 153-159.

Lauren M Singer and Patricia a Alexander. 2017. Reading across mediums: Effects of reading digital and print texts on comprehension and calibration. The journal of experimental education 85, 1 (2017), 155-172.

* cited by examiner

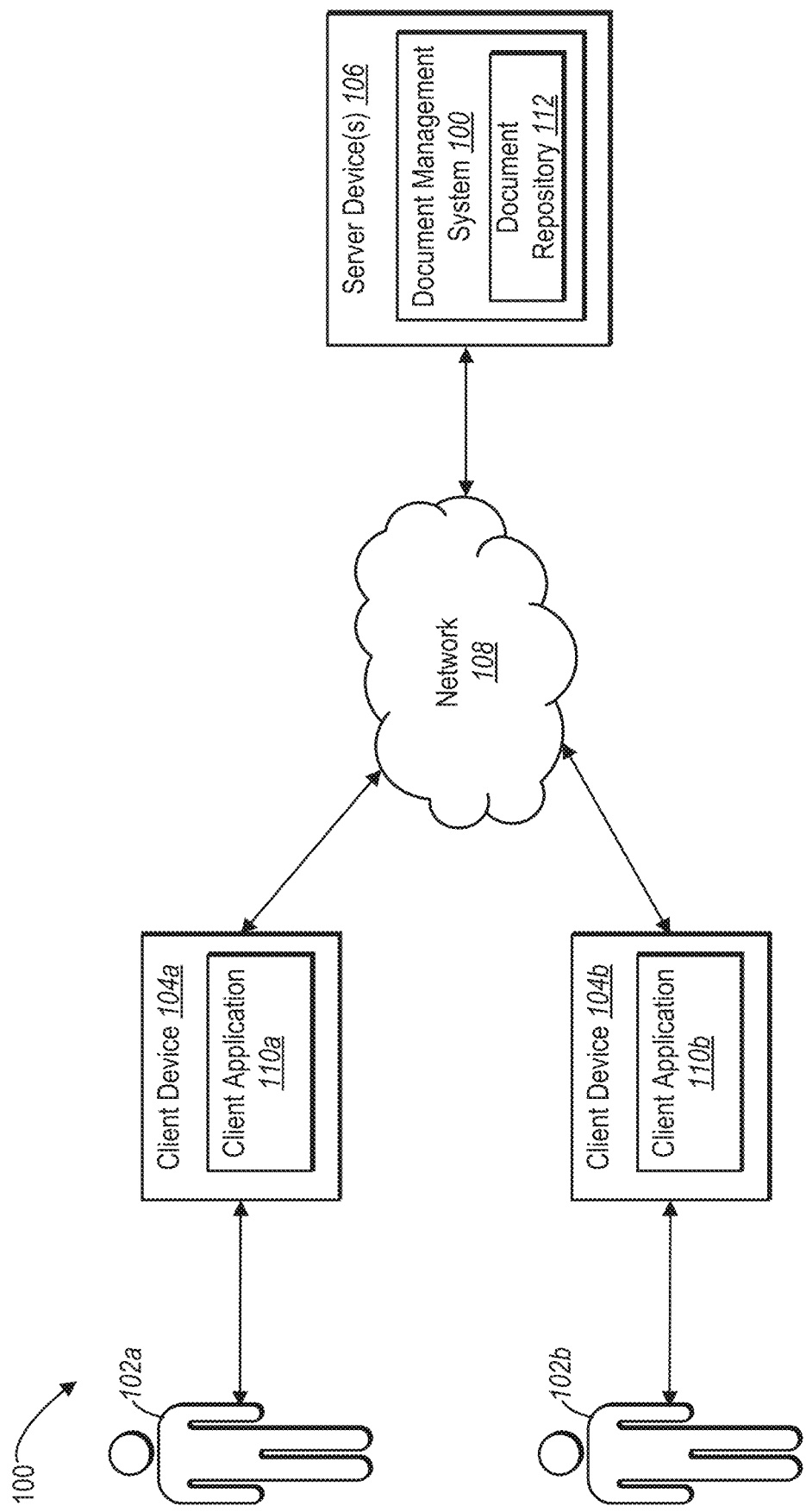

1. Background
- Neutralization is the elimination of phonological contrast in certain phonetic environments. One of the major examples in Russian is devoicing.
- Devoicing is the process of changing of a voiced consonant to an unvoiced consonant.
- In Russian this can happen due to assimilation, or word final position of the consonant, this study focuses on the latter.
- Former studies focused on devoicing in languages such as Dutch and German, but there have not been as many on Russian devoicing.
- This study also aims to define the influence of L2 English on L1 Russian speakers devoicing as well as L2 Russian acquisition of final devoicing.

2. Method
- Subjects:
o 11 native Russian speakers. 7 of those 11 had English as a second language, while the other 4 lived in Russia and had minimal exposure to English.
o 9 native English speakers learning Russian. 5 were students, 3 teachers and one family member of a professor.
- Stimuli
o The stimuli consisted of 34 word pairs that had underlying differences in the voicing of the final consonant.

|  | Stimuli | Natives | L2 ~~L1~~ Speakers | Scores | Result |
|---|---|---|---|---|---|
| Test 1 | 34 | 11 | 8 | 94 | L5 |
| Test 2 | 34 | 11 | 9 | 75 | L3 |

*Fig. 2B*

1. Background
• Neutralization is the elimination of phonological contrast in certain phonetic environments. One of the major examples in Russian is devoicing.
• Devoicing is the process of changing of a voiced consonant to an unvoiced consonant.
• In Russian this can happen due to assimilation, or word final position of the consonant, this study focuses on the latter.
• Former studies focused on devoicing in languages such as Dutch and German, but there have not been as many on Russian devoicing.
• This study also aims to define the influence of L2 English on L1 Russian speakers devoicing as well as L2 Russian acquisition of final devoicing.

2. Method
• Subjects:
o 11 native Russian speakers. 7 of those 11 had English as a second language, while the other 4 lived in Russia and had minimal exposure to English.
o 9 native English speakers learning Russian. 5 were students, 3 teachers and one family member of a professor.
• Stimuli
o The stimuli consisted of 34 word pairs that had underlying differences in the voicing of the final consonant.

|        | Stimuli | Natives | L1 Speakers | Scores | Result |
|--------|---------|---------|-------------|--------|--------|
| Test 1 |         |         |             |        |        |
| Test 2 |         |         |             |        |        |

*Fig. 3B*

SYNCING DIGITAL AND PHYSICAL DOCUMENTS

BACKGROUND

Creating, editing, and reviewing documents often involves a number of different people involved at different stages of the documents. The creation of documents involving group collaboration can include incorporating work product from a number of different people into a final product. Additionally, a collaborative document creation/revision process can involve more than one person working on the document at the same or different times and/or in the same or different locations. Some people also prefer to create/revise documents using physical paper, such as by printing out the documents for revising and/or making notes. Accordingly, verifying that any modifications made to the document at any time during the process are accounted for when creating a final version of the document is an important part of the creation/revision process to ensure that the final product is complete and accurate.

To provide better collaboration in a document creation/revision process, some conventional systems allow users to share electronic documents via various electronic communication methods. For example, some conventional systems allow users to synchronize electronic documents (e.g., to a cloud storage service) to a shared workspace, which allows the collaborative group members to access the electronic documents from their own devices. Additionally, such a shared workspace allows the users to work on the electronic documents from their own devices at any time and then share any new content or revisions with the other group members. Sharing a document with such a conventional system, however, often leads to conflicting copies of the document on the separate devices of the users or in the shared workspace if multiple users access the document simultaneously.

To improve the document creation/revision process, other conventional systems allow users to work within a shared document at the same time. Specifically, a cloud system that hosts a shared document and provides simultaneous access rights to the document for a plurality of users. Accordingly, a plurality of different users can view and modify a single document at the same time via the cloud system. Providing simultaneous access to an electronic document for a plurality of users to modify from different devices reduces the need for users to upload the document each time they make revisions.

While conventional systems provide environments for collaborative creation and revision of documents, the conventional systems fail to account for physical copies of documents in the workflow. Specifically, although the conventional systems allow one or more users to store electronic documents in a cloud storage for accessing from any number of different devices and locations at the same or different times, incorporating changes made to physical documents into the electronic copies can be cumbersome and easily forgotten. For example, conventional systems typically require a user to manually enter the changes from a physical copy into the electronic document. Similarly, conflicting revisions or information between physical documents and their corresponding electronic document counterparts are not easily resolved using the conventional systems. These and other disadvantages may exist with respect to conventional collaborative document creation/revision techniques between physical and electronic documents.

BRIEF SUMMARY

Embodiments of the present disclosure provide benefits and/or solve one or more of the foregoing or other problems in the art with systems and methods for incorporating physical documents into a shared review workflow. In one or more embodiments, in response to detecting the presence of a physical document within a field of vision of an augmented reality device, the systems and methods map the physical document to an electronic document and determine one or more differences between the electronic document and the physical document. The systems and methods then generate a shared state mapping including any identified differences between the electronic and physical copies of the document. The systems and methods also synchronize the physical document and the electronic document by inserting the difference(s) into an augmented reality layer or by storing the difference(s) in the electronic document, respectively. Accordingly, the disclosed systems and methods provide a reliable process for incorporating and syncing physical documents into a document creation and review process involving corresponding electronic documents.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIG. 1 illustrates an example computing environment within which a document management system can operate in accordance with one or more embodiments;

FIGS. 2A-2D illustrate example diagrams and user interfaces for a document review workflow involving an electronic document and a corresponding physical document in accordance with one or more embodiments;

FIGS. 3A-3C illustrate example diagrams and user interfaces for another document review workflow involving an electronic document and a corresponding physical document in a shared document workflow in accordance with one or more embodiments;

DETAILED DESCRIPTION

Figure 2A:
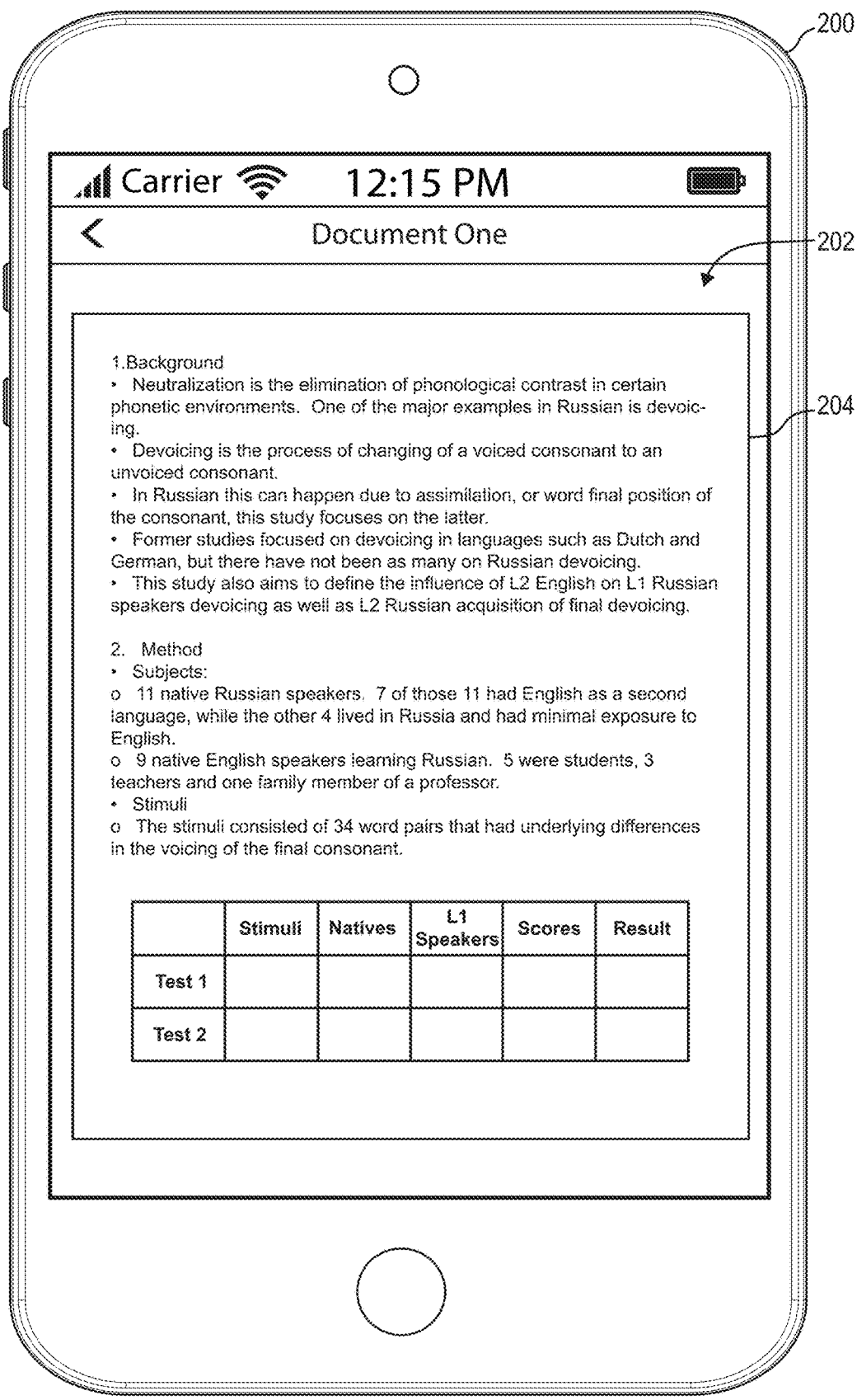

One or more embodiments of the present disclosure provide a document management system that synchronizes physical documents with electronic documents in a review workflow. In particular, the document management system analyzes a physical document detected within a field of view of an augmented reality device to identify visual features of the physical document. Based on the identified visual features, the document management system maps the physical document to its electronic document counterpart. After mapping the physical document to the corresponding electronic document, the document management system creates a shared state mapping that includes differences between the physical document and the electronic document. Furthermore, the document management system uses the shared state mapping to synchronize the physical document with the electronic document by applying the differences to an augmented reality layer on the physical document and/or by storing the differences in the electronic document, as applicable. Thus, the document management system allows users to easily integrate revisions or comments from a physical copy of a document into the shared review workflow for the document.

For example, when a physical document enters the field of view of an augmented reality device, one or more embodiments of the document management system analyze the physical document to identify a visual feature(s) of the physical document. The document management system then compares the identified visual feature(s) to visual features included in a database of visual features that the document management system extracted from existing electronic documents. When the document management system finds a match between the visual feature(s) of the physical document and the visual features in the database, the document management system maps the physical document to the corresponding electronic document.

Additionally, the document management system performs an initial synchronization process for synchronizing the physical document with the electronic document. Specifically, the document management system determines whether the physical document and the electronic have any differences. For example, if either the physical document or the electronic document includes differences that the other document does not have, the document management system identifies these differences. To illustrate, the document management system can create a first differences list to indicate differences between the physical document and an original (unannotated) electronic document, and a second list to indicate differences between the electronic document with annotations and the original electronic document. The document management system then compares the first and second differences lists and stores the identified differences in a shared state mapping that indicates the annotation differences from both the physical document and the electronic document. If any additional differences are detected while the physical document is within the field of view of the augmented reality device, the document management system updates the shared state mapping to reflect the additional differences.

The document management system then uses the shared state mapping to apply any differences to the physical document and/or the electronic document based on whether each difference is included in the physical document or the electronic document. In particular, the document management system applies differences to the electronic document by determining that the shared state mapping includes one or more differences that are not in the electronic document and then adding the differences to the electronic document. Conversely, if the document management system determines that the shared state mapping includes differences that are not in the physical document, the document management system applies the differences to an augmented reality layer that is laid over the physical document within the field of view of an augmented reality device.

By leveraging augmented reality, the document management system allows users to quickly, easily, and accurately incorporate physical documents into a shared review workflow. As described above, the document management system is able to identify and synchronize differences across different copies of the same record using an augmented reality device even if one or more of those copies are physical documents. As such, a user involved in a shared review workflow can print a document, make changes or add notes to the document, and incorporate the changes/notes in an electronic copy of the document by viewing the printed document with an augmented reality device. Similarly, the user can view changes to the electronic copy of the document on the physical copy of the document by way of an augmented reality layer that displays the changes on the physical document.

Furthermore, creating a shared state mapping that maps differences between physical and electronic copies of a document allows a plurality of users to view revisions or additions to the document in real time. In particular, the document management system allows a first user working on a physical copy of the document to view changes that a second user makes to a different copy of the document as the second user makes the changes. For example, the first user can view changes to the document on a first physical copy of the document even if the first user is not currently viewing the copy to which the second user is making changes. Thus, the document management system provides revision synchronization for a plurality of physical documents corresponding to an electronic document as the changes occur.

As described herein, the document management system provides advantages over conventional document sharing systems. Specifically, the document management system improves technological process related to electronic document editing/sharing by allowing a computing device to detect changes to a physical document and automatically incorporate those changes into an electronic version of the same document. Whereas conventional document sharing systems require users to manually enter changes from a physical document into an electronic version of the document, the document management system described herein allows the computing device to perform such functions without user input. Thus, the document management system improves the functionality of the computing device itself for performing operations related to document sharing and synchronization.

Similarly, the document management system improves the technological process related to electronic document editing/sharing by allowing a computing device to project changes to an electronic document onto an already existing physical version of the same document using augmented reality. By leveraging augmented reality, the document sharing system eliminates the need to print out new physical copies of a document to view the changes on a physical document after making changes to the electronic version of the document. Accordingly, the document management system provides a computing device (or devices) with flexibility in sharing electronic documents and making changes to electronic and/or physical documents in connection with one or more users and existing versions of a document.

As described briefly above, the document management system provides annotation synchronization between corresponding physical and electronic documents. FIG. 1 illustrates an example environment in which a document management system 100 allows users to engage in a process for creating or revising physical and electronic documents. The environment includes a first user 102a operating a first client device 104a, a second user 102b operating a second client device 104b, and server device(s) 106. The first client device 104a and the second client device 104b (collectively, "client devices 104a, 104b") can communicate with the server device(s) 106 via a network 108.

Each of the client devices 104a, 104b and the server device(s) 106 also include one or more components. As illustrated, the first client device 104a includes a client application 110a and the second client device 104b includes a client application 110b (collectively, "client applications 110a, 110b") that allow the first user 102a and the second user 102b (collectively, "users 102a, 102b"), respectively, to view, modify, and/or otherwise interact with documents during a review workflow. As used herein, the term "document" refers to a record including one or more content items. Specifically, a document can include a "physical document," which is a physical copy of a record (e.g., a printed copy of a record), or an "electronic document," which is a digital copy of a record (e.g., a digital file). As described in more detail below, a user can physically mark a physical document with a tool including, but not limited to, a pen, a pencil, a marker, or other writing tool. Additionally, a user can digitally modify an electronic document within a user interface of a client application (e.g., client applications 110a, 110b) with a user input device.

As illustrated, the client applications 110a, 110b can run on the client devices 104a, 104b to provide document editing and revision capabilities for a number of different document types. Additionally, the client applications 110a, 110b can allow the users to communicate with the document management system 100 on the server device(s) 106 in connection with a document review workflow. The client applications 110a, 110b can also communicate with the document management system 100 to upload electronic documents to a document repository 112 on the server device(s) 106. The users 102a, 102b can also use the respective client applications 110a, 110b to access electronic documents in the document repository 112 to view and/or modify the electronic documents. Accordingly, one or more users can access an electronic document within the document repository 112 to modify the electronic document in connection with the review workflow for the electronic document.

Figure 3A:
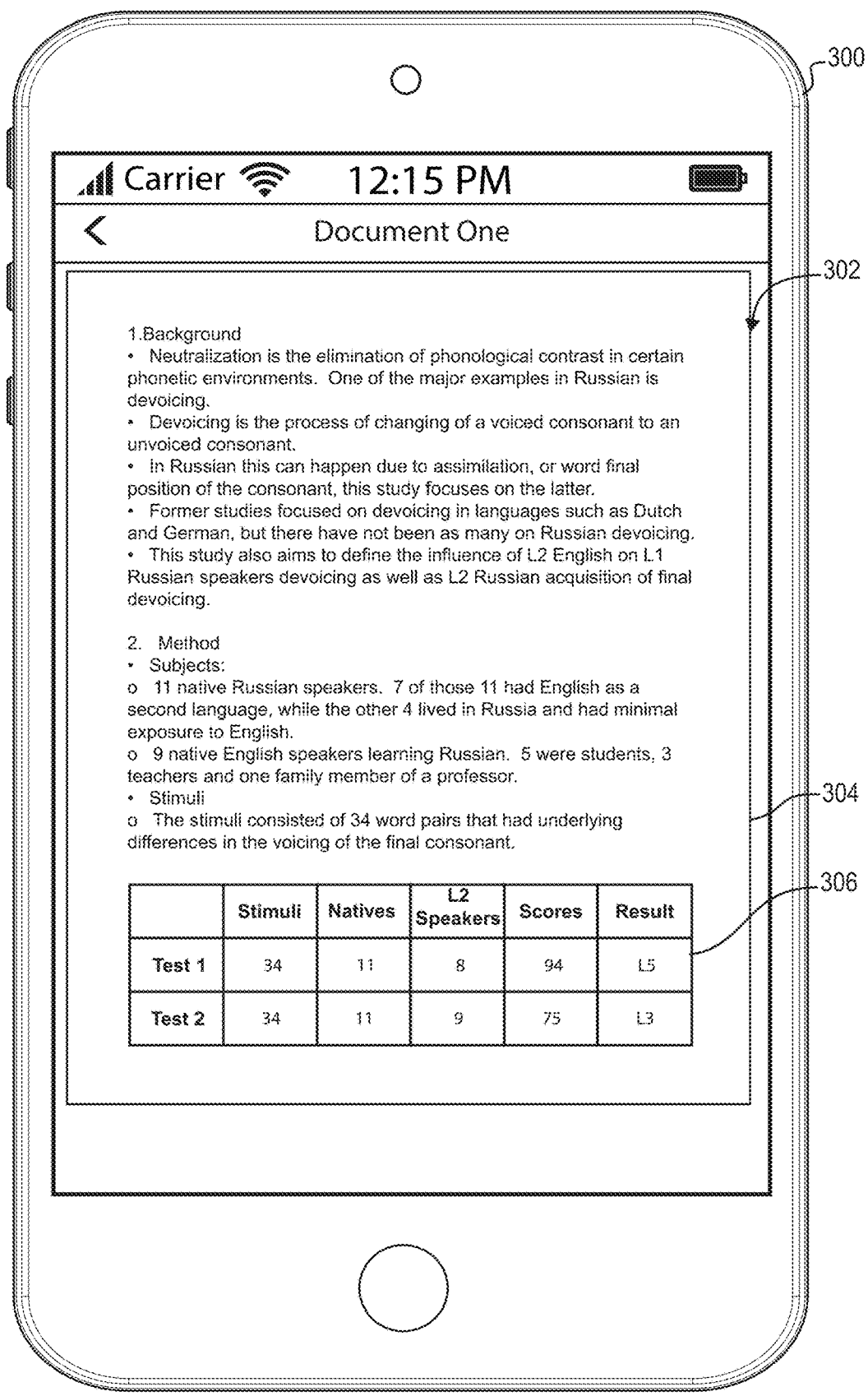
Figure 3C:
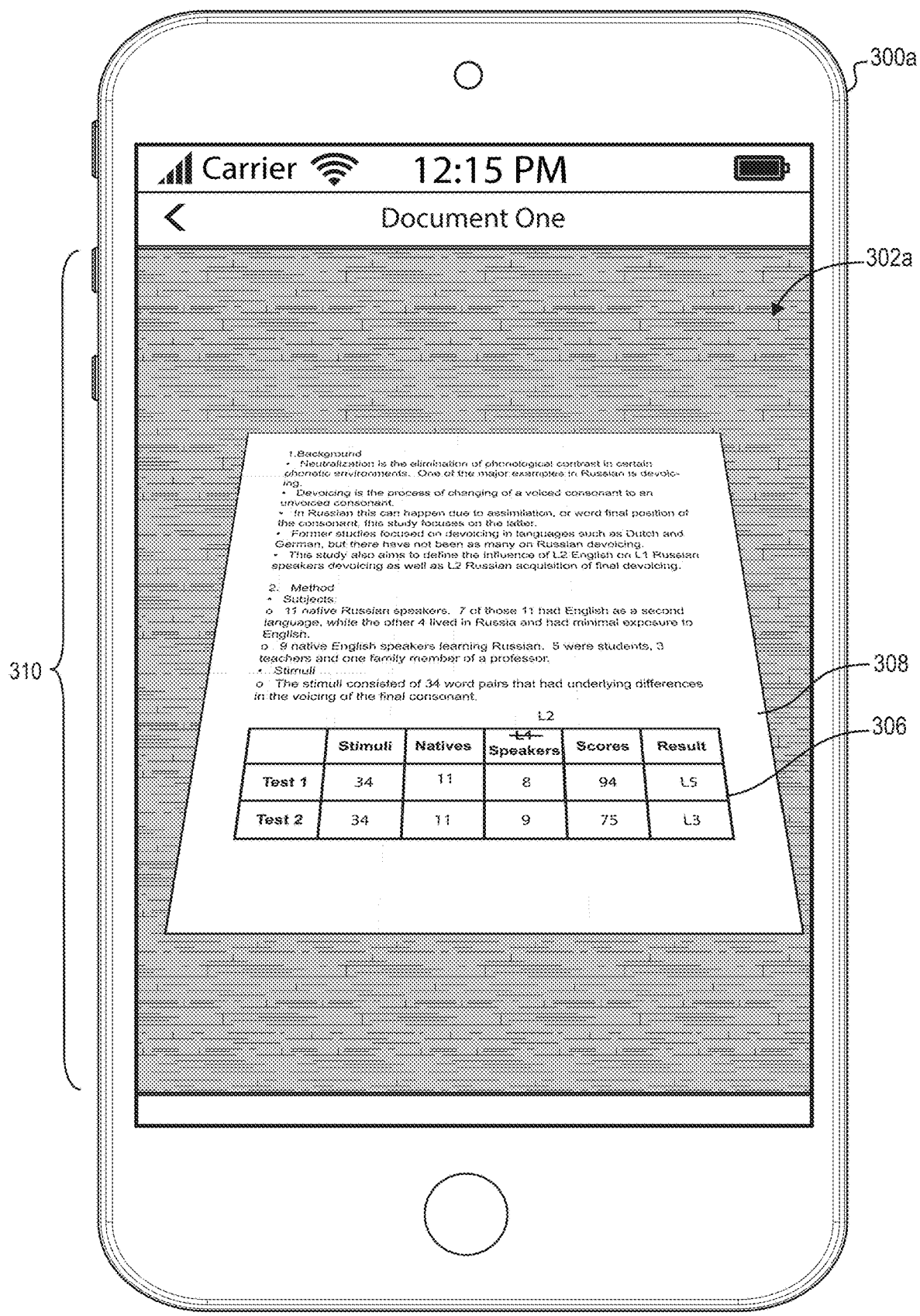

The client applications 110a, 110b also provide functionality for users to view physical documents within an augmented reality ("AR") environment. In particular, the client applications 110a, 110b can display information associated with a physical document within an AR layer in the AR environment. For example, the AR layer can include annotations from the corresponding electronic document that are not in the physical document. Additionally, the client applications 110a, 110b can allow users to interact with the AR layer directly to include annotations for displaying on the physical document. FIG. 3C and the corresponding description describe AR layers in more detail below.

As used herein, the term "annotation" refers to a visual marking in a document. For example, an annotation can include text, images, drawings, symbols, or other visual markings that change a visual appearance of a document. Additionally, an annotation on a physical document can be a physical marking that is handwritten/hand drawn, typed, stamped, or physically attached to the document. An annotation to an electronic document can be a digital marking entered using a keyboard, mouse, touchscreen input (e.g., a finger or digital writing tool), or other electronic input device. An annotation can also include information that modifies existing information in a document, such as by associating a specific annotation with a rule to modify existing content in other copies of the document. To illustrate, the rule can indicate to the document management system 100 to delete content, replace content, or change a characteristic of content in other copies of the document.

In one or more embodiments, the client applications 110a, 110b are implemented as stand-alone applications, such as a desktop or mobile application, or as one or more web-based applications hosted on a remote server. Furthermore, the client applications 110a, 110b may be implemented in a suite of mobile device applications or "apps." To illustrate, the suite of applications can include one or more applications such as, but not limited to, applications in ADOBE® DOCUMENT CLOUD®, ADOBE® ACROBAT®, and ADOBE® SIGN. "ADOBE" and "ACROBAT" are registered trademarks of Adobe Systems Incorporated in the United States and/or other countries.

Although the environment in FIG. 1 illustrates a specific configuration of hardware and software, the environment can include other configurations of hardware and/or software. For example, the environment may include any number of additional or alternative components (e.g., any number of server(s), client devices, or other devices). To illustrate, the document management system 100 may be implemented in a distributed server environment (e.g., in a cloud storage system) that allows a plurality of client devices to access the document management system 100 via the network 108. In one or more alternative embodiments, the document management system 100 runs on a single computing device such as the client devices 104a, 104b, such that the client devices 104a, 104b can perform all of the operations associated with a document creation/revision workflow involving electronic documents and physical documents. Additionally, the document management system 100 may be implemented as one or more operating systems, in one or more stand-alone applications, as one or more modules of an application, as one or more plug-ins, as one or more library functions or functions that may be called by other applications, and/or as a cloud-computing model.

Although FIG. 1 illustrates client devices 104a, 104b in communication with the server device(s) 106, the server device(s) 106 may communicate with any number of client devices, including a single client device operated by a single user, for performing operations associated with a document review workflow. Furthermore, although FIG. 1 illustrates a plurality of devices communicating with each other over a network to perform the functions of the document management system 100 on server device(s) 106, the document management system 100 may be implemented in a single device, such as a client device operated by one or more users. Additionally, while FIG. 1 illustrates certain details associated with various devices and components associated with a document management system 100, FIG. 6 and the accompanying description detail additional components and functionalities of the document management system 100 in more detail.

According to one or more embodiments, the client devices 104a, 104b include computing devices that are capable of providing an AR environment in connection with the client applications 110a, 110b. For instance, the client devices 104a, 104b can include a desktop computing device, laptop computing device, handheld computing device (e.g., a mobile phone or tablet). The client devices 104a, 104b can include computing devices with an image/video capture device, a display device, and a processor capable of receiving input from the image/video capture device and outputting the input from the image/video capture device with one or more AR layers. The client devices 104a, 104b and the server device(s) 106 can include additional components as described in more detail below with respect to FIG. 7. Additionally, inputs to the client devices 104a, 104b can include, but are not limited to, peripheral devices (e.g., a mouse or touchpad) or a touchscreen input.

Similarly, the server device(s) 106 can include any type of computing device capable of implementing one or more components of the document management system 100 of FIG. 1. For example, the server device(s) 106 can host the document repository 112 in a cloud storage system or other distributed storage system that allows users to access electronic documents via the network from any device. The server device(s) 106 can also provide document management services, as described herein, to users by registering the users with the document management system 100. Alternatively, the document repository 112 can be part of a separate system that hosts electronic documents and makes the electronic documents accessible to the document management system 100.

As illustrated, the document management system 100 allows the users 102a, 102b to upload, view, and edit documents stored in the document repository 112 individually or in a shared review workflow (e.g., involving a single user or multiple users). As will be described in more detail below, the document management system 100 analyzes information from the client applications 110a, 110b and electronic documents in the document repository 112 to map physical documents within a field of view of the image/video capture devices of the client devices 104a, 104b to existing electronic documents.

Furthermore, the document management system 100 stores a shared state mapping that includes differences between the physical documents and corresponding electronic documents. The document management system 100 communicates with the client applications 110a, 110b to provide any relevant differences from the shared state mapping to the client devices 104a, 104b to display on display devices within one or more AR layers. Additionally, the document management system 100 uses the shared state mapping to store any relevant differences in the electronic documents.

As used herein, the term "shared state mapping" refers to a mapping that includes differences between copies of a document. In particular, a shared state mapping describes relationships between differences (e.g., differences) in a physical document and a corresponding electronic document. For example, a shared state mapping includes information about a difference and indicates to which copy a particular difference belongs. To illustrate, if a physical document includes an annotation that is not included in the electronic document, the shared state mapping stores the annotation information (e.g., a visual appearance, location, size, etc., of the annotation) and an indication that the annotation is in the physical document.

As described previously, the document management system 100 can synchronize information across a plurality of different copies (including physical and electronic copies) of a document. FIGS. 2A-2D illustrate a document review workflow involving an electronic document and a corresponding physical document. As described in more detail below, FIGS. 2A-2D and the accompanying description illustrate a process for identifying annotations on a physical document and then applying those annotations to the electronic document.

In one or more embodiments, illustrated in FIG. 2A, a client device 200 that includes a client application 202 that allows a user to view and interact with an electronic document 204. Specifically, the client application 202 can provide tools for accessing electronic documents from a document repository. For example, the user can access content stored in the document repository from within the client application 202 to view one or more electronic documents. The document repository can include a local storage on the client device 200 that allows the user to store and access electronic documents without accessing an external device or system. Additionally, the document repository can include a remote storage that allows the user to store and access electronic documents via a network connection, as illustrated in FIG. 1.

According to one or more embodiments, a user accesses the electronic document 204 from a document repository by signing into a document management service. For instance, the document management service can provide access to an application suite of related applications. The document management service allows the user to store and access electronic documents in the document repository using any of the applications in the application suite. Accordingly, the document management service provides a way for users to create documents and share documents across a variety of applications. The document management service can also allow the user to share stored documents with other users of the document management service, thereby providing a simple way for users to engage in a shared review workflow.

The electronic document 204 can include any type of digital file that allows a user to enter information into the digital file. Specifically, the user can input text, images, or other types of content into the electronic document 204, depending on the document format and/or the capabilities of a program used to create the electronic document 204 (which may be the client application 202 or another application). As illustrated, the electronic document 204 includes a text document that allows the user to input text using a keyboard or other text input device. Furthermore, the electronic document 204 can include other content common to text documents, such as tables or other simple shapes. In one or more additional embodiments, the electronic document 204 includes other types of content such as color images.

According to one or more embodiments, the client application 202 includes tools that allow a user to interact with the electronic document 204. For example, the client application 202 can allow the user to modify the electronic document 204 by inserting content into the electronic document 204. To illustrate, the tools can include text editing tools, image editing tools, formatting tools, or other tools that allow the user to modify the contents of the electronic document 204 or other characteristics of the electronic document 204. Thus, the user can modify the electronic document 204 directly via the tools that the client application 202 provides.

As described previously, some users may prefer to review and revise documents using physical copies of the documents. Accordingly, a user can generate a physical copy of the electronic document 204, for example, by printing the electronic document 204. FIG. 2B illustrates a physical document 206 corresponding to the electronic document 204 of FIG. 2A. As illustrated, the user revises the physical document 206 to modify or add content to the physical document 206. Accordingly, the physical document 206 includes content that is not included in the electronic document 204.

As illustrated in FIG. 2B, the physical document 206 includes a plurality of physical annotations. Comparing the physical document 206 of FIG. 2B to the electronic document 204 of FIG. 2A, one can appreciate that the table 208 in the physical document 206 includes information that in not included in the electronic document 204. For example, the physical document 206 of FIG. 2B includes a table 208 with a plurality of columns and rows. Specifically, the table 208 includes a plurality of physical annotations filling a plurality of the cells of the table 208 with a plurality of numbers that are not included in the electronic document 204.

To illustrate, the annotations in the table 208 can include data that a user collects in connection with the content of the physical document 206. For instance, the user can collect information to fill the table 208 in connection with a research study. As the user performs or observes the performance of the research study, the user can fill the cells in the table 208 of the physical document 206 with the corresponding results of the research study. Alternatively, the user can enter the information in the electronic document 204. In either case, the document management system allows the user to synchronize the information across a physical document 206 and a corresponding electronic document 204.

In one or more additional embodiments, the user can make other types of physical annotations on the physical document 206 to indicate changes to the existing content of the physical document 206. In particular, the user can make copy editing marks on the physical document to indicate changes to existing content by deleting or modifying the content and/or inserting additional content into the existing content. For example, the user can make copy editing marks (e.g., a deletion mark 210) to delete existing text, insert text into the existing text, change text to uppercase or lowercase, modify punctuation or spacing, or other copy editing corrections. Thus, the user can add content, for example, to fill a form as well as change the existing content of the physical document 206. As described in more detail below, the document management system can identify and interpret the annotations, and then modify the electronic document 204 accordingly.

Figure 2C:
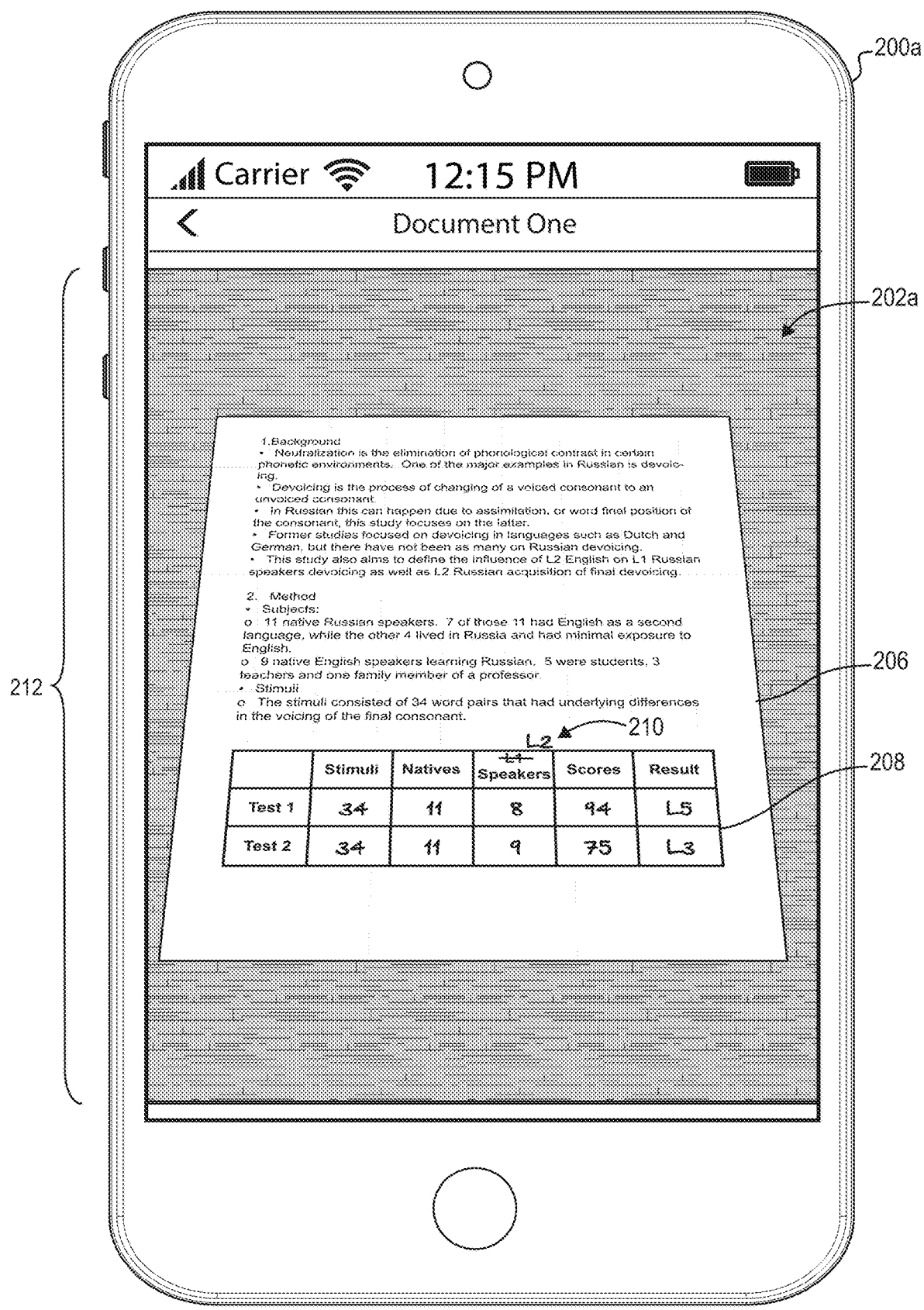

After the user modifies the physical document 206, or while the user is actively modifying the physical document 206, the document management system can detect the changes and then synchronize the electronic document 204 to the physical document using an image capture device. FIG. 2C illustrates the physical document 206 in an AR environment of a client device 200a. Specifically, the client device 200a runs a client application 202a that displays an AR interface 212 including a view of the physical document 206 within the AR environment.

In at least some implementations, the client application 202a of FIG. 2C is the same client application 202 of FIG. 2A. In particular, the client application 202a can provide a first interface to allow a user to view and interact with electronic documents and a second interface to display the AR environment for viewing physical documents. Alternatively, the client application 202a can be a different application than the client application 202 from FIG. 2A, but within the same application suite. Thus, the user can access the document repository and perform various operations associated with the document management system through the use of one or more client applications.

As previously mentioned, the client device 200a can be any computing device that allows a user to capture image or video of the physical document 206 and then display the physical document 206 with one or more AR layers in the AR environment on a display device. To illustrate, the client device 200a can be a smartphone or other handheld device on which the client application 202a operates to provide the AR environment. Alternatively, the client device 200a can be a wearable AR headset device that projects or displays the AR environment on one or more lenses through which the user views the physical document 206. In at least some embodiments, the client device 200a is a different client device than the client device 200 of FIG. 2A operated by a different user (e.g., separate users within a group of users working within the same shared review workflow).

In one or more embodiments, the document management system detects that the physical document 206 is present within a field of view of the image capture device. As used herein, the term "field of view" refers to the observable space captured by the image capture device of an AR-capable device at any given time. For example, the field of view can be defined by one or more technical characteristics of the image capture device, including the size of an image sensor, a focal length, and/or other characteristics of the image capture device. While an AR environment is active within an application of an AR-capable device, the field of view is illustrated as a user interface of a display device of the AR-capable device.

To activate an AR environment, the user can open the client application 202a or select an option within the client application 202a to activate the image capture device of the client device 200a. When the user initiates the AR environment within the client application 202a, the document management system can use image processing techniques to determine that one or more boundaries of the physical document 206 is within the field of view. To illustrate, the document management system can determine that sides or corners of the physical document 206 are within the field of view in response to the user activating the AR environment to view the physical document 206. Additionally, the document management system can distinguish the physical document 206 from other objects within the field of view based on characteristics common to physical documents (e.g., the shape).

In one or more embodiments, the document management system analyzes the physical document 206 to identify visual features of the physical document 206. Specifically, the document management system can use one or more image processing techniques to identify visual features that distinguish the physical document 206 from other documents. To illustrate, the document management system can use bitmap feature extraction to identify the various visual features of the physical document 206. For instance, the visual features can include, but is not limited to, regions of text, images, shapes, size of text regions, shape of text regions, size of images, shape of images, content of text regions, content of images, and other unique or distinguishing features of the physical document 206.

Additionally, the document management system can analyze the physical document 206 to determine a location of each visual feature of the physical document 206. For example, the document management system can determine a location of a visual feature with respect to the boundaries of the physical document 206. The location can be expressed as a set of three-dimensional coordinates relative to the boundaries of the physical document 206 by utilizing information about the physical document 206 in the three-dimensional space within the field of view. Alternatively, the document management system can determine the location by extracting the contents of the physical document 206 as a two-dimensional layer and determining the location of each visual feature using two-dimensional coordinates relative to the boundaries of the two-dimensional layer. In either case, the document management system determines the location of each visual feature relative to other visual features and boundaries of the physical document 206 using a two-dimensional or three-dimensional coordinate system.

After identifying the visual features of the physical document 206, the document management system determines an electronic document that corresponds to the physical document 206. In particular, the document management system compares the features of the physical document 206 to features of existing electronic documents in the document repository. The document management system can use image processing to determine whether the visual features of the physical document 206 match the visual features of an electronic document in the document repository. To illustrate, the document management system can use bitmap feature comparison techniques to determine that one or more features in the physical document 206 are different than the visual features of the corresponding electronic document.

As mentioned previously, the document management system can generate a database of visual features from the electronic documents in the document repository. When generating the database, the document management system can extract visual features of the electronic documents using image processing techniques. For example, the document management system can obtain rendered image snapshots of the original electronic documents (e.g., bitmap representations of the electronic documents with no visual representations of annotations present in the electronic documents) and then apply one or more image processing techniques to the rendered image snapshots. The document management system can identify visual features of an electronic document when the electronic document is stored for the first time in the document repository. The document management system can also analyze an electronic document each time the electronic document is updated. In one or more embodiments, the document management system also uses text analysis to determine content of the electronic documents for comparing to content of physical documents.

In one or more embodiments, the document management system extracts visual features of an electronic document by using image processing to analyze portions of the electronic document (e.g., image patches of a predetermined pixel size) to identify text, shapes, objects, etc. The document management system can optionally use character recognition or metadata analysis in combination with the image processing to determine text content of the electronic document and group the text into blocks. After detecting text (e.g., a block of text), a shape, or an object within one or more image patches, the document management system can assign an identifier to the detected text, shape, or object. The identifiers can allow the document management system to recall the detected portion of the electronic document for comparing to visual features of a physical document.

The document management system also maps the extracted visual features to the corresponding electronic documents and stores the extracted visual features with the mapping information in the database. For example, the document management system can maintain the visual features from the electronic documents as separate image snapshots in the database. The document management system can then map each of the separate image snapshots to the corresponding electronic document, along with the location information for the visual features (e.g., coordinates of the visual features within the electronic document). Alternatively, the document management system can identify the visual features and store mapping information and location information with the electronic documents (e.g., within metadata associated with the electronic documents). For instance, the document management system can generate metadata that identifies a specific portion of an electronic document, the contents of the specific portion, the location of the specific portion, and/or other information that allows the document management system to quickly locate the portion of the electronic document for comparing to visual features of the physical document 206.

Once the document management system finds a matching electronic document (e.g., the electronic document 204 of FIG. 2A) for the physical document 206, the document management system maps the physical document 206 to the corresponding electronic document. In one or more embodiments, the document management system matches the physical document 206 to an electronic document if a threshold amount of the visual features of the physical document 206 matches the electronic document. In one example, the threshold amount can be less than all of the visual features (e.g., if the physical document 206 includes physical annotations that are not in the electronic document). The document management system can also determine that the physical document 206 has features that are more similar to the features of an electronic document than to the features of other electronic documents.

In one or more embodiments, the document management system matches the physical document 206 to the electronic document 204 by using image processing to analyze the physical document 206. For instance, similar to detecting visual features of an electronic document, the document management system can analyze the physical document 206 by sequentially analyzing image patches of the physical document 206 to detect blocks of text, shapes, or other objects. The document management system can then use image processing techniques for comparing detected objects from the physical document 206 to visual features stored in the database.

In at least some instances, the document management system determines that visual features of a physical document 206 correspond to visual features of an electronic document if a threshold number of visual features from the physical document 206 matches visual features corresponding to the electronic document. For example, because a physical document 206 can include annotations that are not in the electronic document 204, the document management system can determine that the physical document matches the electronic document if the physical document substantially matches the electronic document. To illustrate, if 90% (or any predetermined threshold) of the visual features of the physical document 206 match visual features of the electronic document, the document management system can determine that the physical document 206 corresponds to the electronic document. Alternatively, the document management system can use a threshold for each visual feature, such that each visual feature of the physical document 206 matches a visual feature of the electronic document if 90% (or any predetermined threshold) of the visual feature (e.g., 90% of the image patches) of the physical document 206 matches the visual feature of the electronic document. Other embodiments can match the visual features and/or the physical/electronic documents in other ways using a combination of various image and text processing techniques.

In one or more embodiments, comparing the features of the physical document 206 to features of an electronic document can include comparing the features of the physical document 206 to individual pages of electronic documents. Specifically, an electronic document can include a plurality of pages, each including different visual features. The document management system can then compare the visual features of the physical document 206 to the visual features of each page of the electronic document. If the document management system determines that the physical document 206 matches a page from a plurality of pages in an electronic document, the document management system can map the physical document 206 to the matching page in the electronic document.

Additionally, the document management system can store the mapping in a storage device that allows the document management system to maintain the relationship between the physical document 206 and the electronic document while the physical document 206 remains within the field of view. For example, the storage device can include a temporary storage device (e.g., a memory device) that maintains the mapping while the physical document 206 is within the field of view. If the physical document 206 leaves the field of view or the document management system stops detecting the physical document 206, the document management system can remove the mapping. Alternatively, the storage device can include one or more temporary mappings that maintain the mapping for a short time if the physical document 206 temporarily leaves the field of view. In at least some implementations, if the physical document 206 leaves the field of view such that the document management system removes the mapping, the document management system matches and maps the physical document 206 to the electronic document again if the physical document 206 reenters the field of view.

After mapping the physical document 206 to an electronic document, the document management system synchronizes the physical document 206 to the electronic document by identifying differences between the physical document 206 and the electronic document. In particular, the document management system analyzes the physical document and the electronic document to determine whether there are differences between the physical document 206 and the electronic document. For example, the document management system analyzes the physical document 206 and the electronic document using image processing techniques to compare image snapshots of the physical document and the electronic document. For instance, the document management system can use the image processing techniques described above (e.g., image patch comparisons) to detect differences between the various visual features of the physical document 206 and the electronic document. Accordingly, the document management system can detect an annotation on the physical document 206 that may not exist on the electronic document by comparing individual image patches of the physical document 206 and electronic document.

If the document management system identifies one or more differences in the physical document 206 that are not in the electronic document, the document management system stores the identified differences in a shared state mapping. In one or more embodiments, the document management system initially generates one or more differences lists that contain annotation differences from the physical document 206 and/or the electronic document. The document management system can use the differences list(s) to determine which of the annotations in the table 208 from the physical document 206 that are not in the electronic document to store the annotations in the shared state mapping. Similarly, if the document management system identifies any annotations in the electronic document that are not in the physical document 206 (e.g., if the electronic document was modified between the creation of the physical document 206 and the document management system detecting the presence of the physical document 206 within the field of view), the document management system also stores the identified annotations from the electronic document in the shared state mapping. Thus, the shared state mapping can include one or more changes between the physical document 206 and the electronic document.

In one or more embodiments, the document management system first creates differences in a differences list from the physical document 206 to the original electronic document. After creating the differences list from the physical document 206, the document management system can then create a differences list from the electronic document (with annotations) to the original electronic document. For example, the document management system identifies all of the annotations in the electronic document that are not in the original electronic document using the bitmap representation of the original electronic document. Thus, the document management system can create two separate differences lists—one to represent the differences between the physical document 206 and the original electronic document, and one to represent the differences between the original electronic document and the annotated electronic document.

After generating the differences lists, the document management system compares the two differences lists to create the shared mapping state. In particular, the document management system can compare the differences in the list comparing the physical document 206 to the original electronic document to the differences in the list comparing the annotated electronic document to the original electronic document. All of the differences that are not present in the differences list from the annotated electronic copy are differences from the physical document 206, and vice versa. The document management system uses these differences to create the shared state mapping.

The document management system can also analyze differences in the differences list to categorize the annotations into separate categories. Specifically, the document management system can analyze each difference to determine whether the difference belongs to one of a plurality of predefined categories. For example, the categories can include annotations such as, but not limited to, notes or other items attached to the physical document 206, highlight annotations, strikeout annotations, and written notes. Additionally, within each category, the document management system can identify additional subcategories or subdivisions if the differences list contains more than one of a specific category. In one or more embodiments, the document management system utilizes image recognition and/or machine-learning techniques, such as a deep learning neural network, to recognize and categorize the differences.

After categorizing the differences, the document management system outputs a set of differences tagged with the type/category. For example, the document management system can generate separate lists for each of the categories and/or subcategories of differences. To illustrate, the document management system can include a list of written annotations, a list of markups, a list of drawings, etc.

The shared state mapping also includes location information for the identified differences for synchronizing the physical document 206 with the electronic document. Specifically, each difference has location information relative to the boundaries and/or other features within physical document 206 (or the electronic document). The document management system stores this location information with the corresponding difference in the shared state mapping. In one or more embodiments, the document management system stores differences individually (e.g., as a plurality of separate differences based on proximity to each other), with the location information each difference stored with the corresponding annotation. Alternatively, the document management system can identify differences and then store the differences together with the location information built into combined data structures/metadata based on the relative positioning.

In one or more embodiments, the document management system stores the shared state mapping as a temporary digital file while the physical document 206 is detected within the field of view. For example, the document management system can store the shared state mapping as a temporary image file in a temporary memory or other storage device. To illustrate, the shared state mapping may be an image file (e.g., a bitmap) with metadata that indicates in which document (i.e., the physical document 206 or the electronic) the document management system detected each difference. To illustrate, the document management system can store information with the shared state mapping to indicate the annotations that the physical document 206 includes, but which are not found in the electronic document. Accordingly, the document management system can store a plurality of differences from a plurality of different copies of a document while retaining information that allows the document management system to determine which copies are lacking any of differences.

Figure 2D:
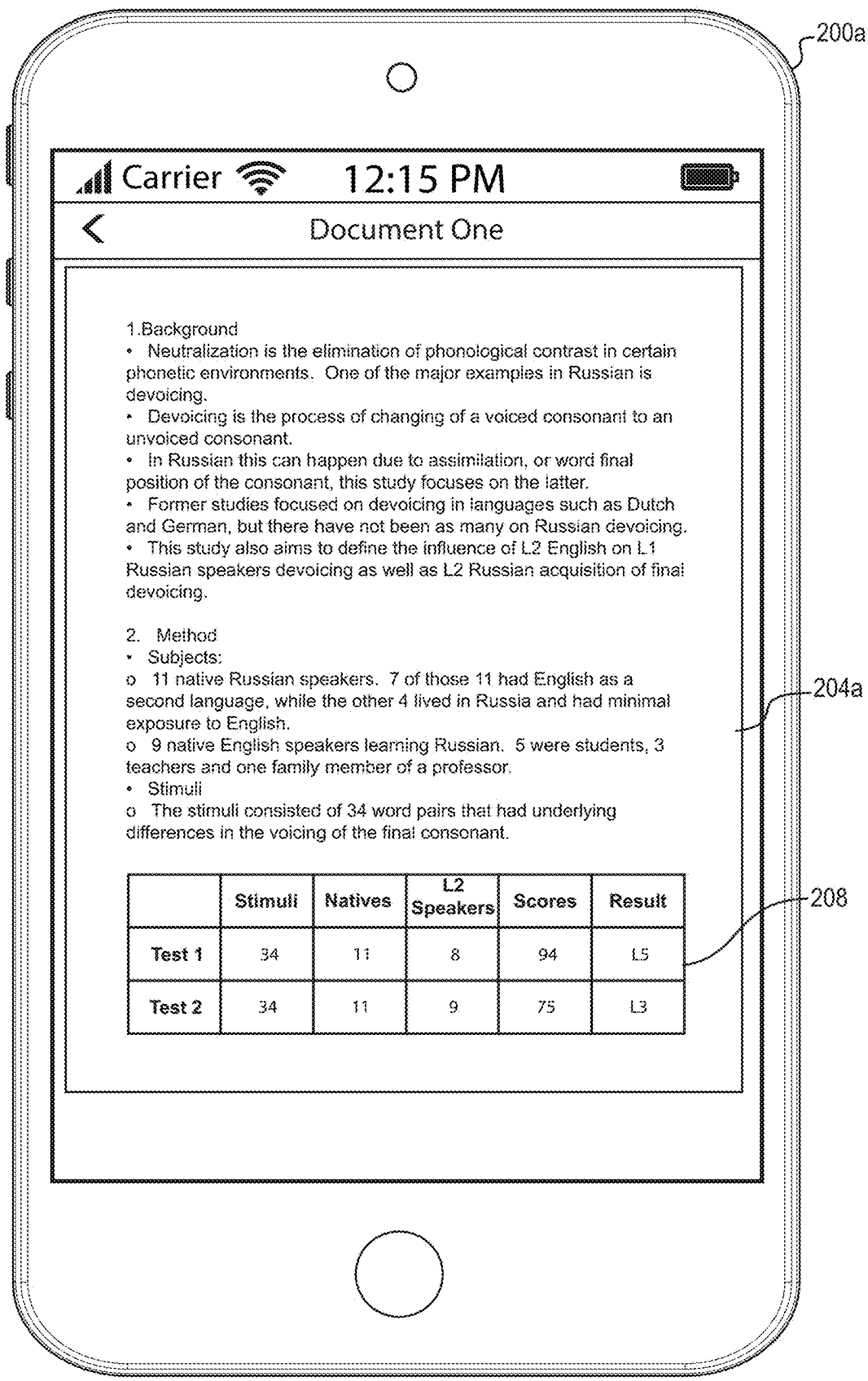

Once the document management system has identified the differences between the physical document 206 and the electronic document 204, the document management system can resolve the differences. Specifically, the document management system can apply the differences in the shared state mapping to the documents. For example, FIG. 2D illustrates, on the client device 200a (though the client device could be client device 200 from FIG. 2A) an updated electronic document 204a after applying the annotations from the shared state mapping (e.g., based on annotations identified in the physical document 206). To illustrate, the document management system updates the electronic document 204 from FIG. 2A to include the annotations from the physical document 206, including the annotations in the table 208.

In one or more embodiments, the document management system applies the annotations to the electronic document 204a from the shared state mapping (i.e., the differences from the physical document 206) by inserting the annotations into the electronic document 204a. To illustrate, the document management system can analyze the annotations to determine an annotation type (e.g., text, drawings, images, shapes) for each of the annotations. For example, the document management system can use character recognition (e.g., optical character recognition) processes to determine whether the annotations include any text. In at least some implementations, in response to identifying text, the document management system inserts the recognized text into the electronic document 204a at the location for the corresponding annotation. Alternatively, the document management system can insert annotations including text as images (i.e., image scans of the annotations from the physical document 206) into the electronic document 204a. Whether the document management system inserts text annotations as text or as image scans into the electronic document 204a may depend on user preferences indicating a preference for an insertion type or based on how/where the annotations are place (e.g., next to existing text or isolated from other text).

Additionally, the document management system can insert non-text differences (e.g., drawings, images, shapes) into the electronic document 204a as included in the physical document 206. In particular, the document management system can insert the differences into the electronic document 204a as images, as described above. In one or more embodiments, the document management system inserts such differences as drawn/depicted. In alternative embodiments, the document management system processes the differences using, for example, by smoothing edges, adjusting colors, etc. User preferences can determine whether the document management system modifies one or more of the differences from the shared state mapping when inserting the differences into the electronic document 204a. Additionally, the type of document, the difference itself, and/or content near the difference in the physical document 206 can determine whether the document management system modifies a given difference.

In one or more embodiments, rather than modifying the original electronic document (e.g., electronic document 204), the document management system can create a new copy of the electronic document to reflect the additional differences. For example, the document management system can save the electronic document 204a with a new or updated name. Alternatively, the document management system can rename the original document (e.g., "[document]_original") and then store the updated electronic document 204a with the name of the original electronic document 204.

After inserting differences from the shared state mapping into the electronic document 204a (i.e., after initializing synchronization between the physical document 206 and the electronic document 204a), the document management system can maintain the synchronization for new differences. Specifically, if the user makes new annotations while the physical document 206 is within the field of view, the document management system can update the shared state mapping to include the new annotations. Additionally, the document management system can update the electronic document 204a to include the new annotations using the shared state mapping. If the physical document 206 leaves the field of view, the document management system can verify that the synchronization is complete and then remove the shared state mapping.

Although FIGS. 2A-2D illustrate a process for synchronizing annotations from a physical document to a corresponding electronic document, the document management system can also synchronize annotations from the electronic document to the physical document. For example, FIGS. 3A-3C illustrate a process for updating an AR layer with annotations for display within an AR environment. Specifically, FIG. 3A illustrates a client device 300 including a client application 302 that allows a user to view and interact with an electronic document 304. In particular, the client application 302 can include tools for modifying the electronic document 304, including adding, removing, or changing content in the electronic document.

As described previously, the document management system can create a shared state mapping that includes differences from an electronic document and a physical document. To illustrate, a user can make one or more differences in the electronic document 304 using tools from the client application 302. In particular, the electronic document 304 of FIG. 3A includes similar annotations to the annotations of FIG. 2B (e.g., within a table 306). As previously noted, an original version of the electronic document 304 may include no annotations, such that the original electronic document is similar in appearance to the physical document illustrated 308 in FIG. 3B. While the content of the physical document 206 of FIG. 2B includes a plurality of handwritten annotations, the user can input annotations in the electronic document 304 using digital editing tools (e.g., text edit or digital drawing tools). As such, an appearance of annotations in the electronic document 304 may be different than an appearance of annotations that are handwritten/hand drawn on a physical document.

FIG. 3B illustrates a physical document 308 corresponding to the electronic document 304, for example, by printing the electronic document 304. As illustrated, the physical document 308 includes features that correspond to the electronic document 304. In the embodiment of FIG. 3B, the physical document 308 does not include one or more annotations included in the electronic document 304 of FIG. 3A. To illustrate, the physical document 308 may not include contents of the table 306. In one or more embodiments, the physical document 308 does not include the same annotations as the electronic document 304 because the physical document 308 was created before a user added the annotations to the electronic document.

As described above, a user may use an AR-capable device to view the physical document 308 within an AR environment. FIG. 3C illustrates the physical document 308 in an AR environment of a client device 300a. Specifically, the client device 300a runs a client application 302a that displays an AR interface 310, which displays the physical document 308 within the AR environment. The client device 300a may be a different device than, or the same device as, the client device 300 of FIG. 3A. Additionally, the client application 302a may be a different application than, or the same application as, the client application 302 of FIG. 3A.

A user operating the client device 300a can initiate the AR environment within the AR interface 310, for example, by opening the client application 302a or selecting an option within the client application 302a to activate an image capture device of the client device 300a. In response to the user initiating the AR environment, the document management system can detect when the physical document 308 enters the field of view of the image capture device. For instance, detecting the presence of the physical document 308 within the field of view can involve detecting the boundaries or corners of the physical document 308 and distinguishing the physical document 308 from other objects within the field of view.

In response to detecting the presence of the physical document 308 within the field of view, the document management system analyzes the physical document 308 to identify one or more visual features of the physical document 308. As described previously, the document management system then compares the identified feature(s) of the physical document 308 to a database of features corresponding to electronic documents in a document repository. The document management system determines whether the visual feature(s) of the physical document 308 match visual features of an electronic document, and if so, the document management system maps the physical document 308 to a corresponding electronic document (e.g., electronic document 304). The document management system can maintain the mapping between the physical document 308 and the electronic document 304 while the physical document 308 remains within the field of view.

After mapping the physical document 308 to the electronic document 304 of FIG. 3A, the document management system synchronizes the physical document 308 with the electronic document 304 by creating a shared state mapping for the physical document 308 and the electronic document 304. As illustrated in FIGS. 3A-3B, the document management system determines that the electronic document 304 includes differences that are not included in the physical document 308. The document management system analyzes the physical document 308 and the electronic document 304 to identify any differences between the physical document 308 and the electronic document 304. For example, the document management system can use image processing techniques to compare an image snapshot of the physical document 308 to an image snapshot of the electronic document 304.

By comparing the physical document 308 and the electronic document 304, the document management system can determine that a user has added content to the electronic document 304 that is not included in the physical document 308 (e.g., after the physical document 308 was created). To illustrate, the document management system can determine that the physical document 308 does not have any annotations in the cells of the table 306. Additionally, the document management system can determine whether any content from the electronic document 304 has been removed or otherwise modified after the creation of the physical document 308.

In one or more embodiments, after identifying differences between the physical document 308 and the electronic document 304 and storing the differences in the shared state mapping, the document management system can generate one or more AR layers for displaying within the AR environment. Specifically, the AR layer(s) can include the differences to display (i.e., the differences from the annotated electronic document) on top of the physical document 308 within the AR environment. For instance, the document management system can include all of the differences in a single AR layer displayed on top of the physical document 308. Alternatively, the document management system can include one or more annotations in separate layers for displaying on top of the physical document. As used herein, the terms "AR layer" and "layer" refer to a video or image component that includes the corresponding annotation information. For example, a layer can be a transparency in the field of view of the AR environment that includes one or more annotations and the location information for the annotation(s) to allow the annotations to be correctly overlaid on top of the physical document within the AR environment.

To illustrate, the document management system can generate a single AR layer by identifying coordinates for the physical document 308 within the three-dimensional AR environment and displaying the differences as a two-dimensional texture mapped to the coordinates of the physical document 308. Thus, the document management system can display all of the annotations as a single texture that is overlaid on top of the physical document 308 within the AR environment based on the three-dimensional coordinates of the physical document 308. In another example, the document management system can determine three-dimensional coordinates for each annotation to overlay each individual annotation as a different texture layer on top of the physical document 308 within the AR environment. In either case, the document management system draws the AR layer with the annotations for each frame in which the physical document 308 is visible within the AR environment.

In one or more embodiments, when creating a texture for overlaying on top of the physical document 308 within the AR environment, the document management system can identify the physical document 308 as a three-dimensional object within the AR environment. By identifying the physical document 308 as a three-dimensional object, the document management system can calculate three-dimensional coordinates for the physical document 308 within the AR environment. For instance, the document management system can determine (x,y,z) coordinates for each corner of the physical document 308 and store the coordinates in an array while the physical document 308 is within the field of view of the AR environment. Additionally, the document management system can determine edge coordinates and size dimensions of the physical document 308 relative to each of the identified corners to define three-dimensional parameters for the physical document 308.

After determining the coordinates and three-dimensional parameters for the physical document 308, the document management system can apply the texture with the annotations to a surface of the physical document 308 within the AR environment using the determined three-dimensional parameters. To illustrate, the document management system can wrap the texture on top of the physical document by treating the face of the physical document 308 as a surface, and then mapping the texture to the corners and edges of the surface. Once applied as a texture, the differences can move in sync with the document. Thus, as the physical document 308 moves within the AR environment, the texture containing the annotations moves with the physical document 308 because the texture is mapped to the coordinates of the physical document 308.

In one or more embodiments, the document management system creates a plurality of separate AR layers for displaying one or more differences. Specifically, the document management system can generate a plurality of AR layers based on the difference types. For example, the document management system determines that differences that add content to a document are displayed within a first AR layer, while differences that remove or change existing content within a document are displayed within a second AR layer. Alternatively, the document management system can categorize differences based on the type of content. For instance, differences associated with text can be in a first layer, differences associated with drawings can be in a second layer, and differences associated with formatting can be in a third layer. As one can appreciate, the document management system can categorize differences into a plurality of different types and provide as many layers as may serve a particular embodiment. In another example, the document management system can categorize differences based on the user that provided the differences, such that different layers indicate different editing users.

Additionally, the document management system can allow a user to view individual layers, modify layers, and/or display layers in various ways. For instance, a user can set a user preference to display one or more layers while hiding one or more other layers. Additionally, each layer can include a distinct visual characteristic that allows users to distinguish layers from other layers while displaying the layers simultaneously. To illustrate, differences displayed within a layer can include a color scheme associated with that layer that marks the annotations within the layer with a specific color. Alternatively, the document management system can modify a three-dimensional appearance of the differences in each layer to provide different depths of the layers on top of the physical document 308.

In one or more embodiments, the document management system displays modifications to content within the physical document using proofreading marks or copy editing marks. For example, the document management system can generate and display strikeouts, underlines, or other annotations indicating that content in the electronic document 304 has changed since the creation of the physical document 308. To illustrate, the document management system can strikeout words, paragraphs, or other content, and display new content using underlines, etc. Alternatively, the document management system can cover deleted or changed content with blank textures (e.g., digital "correction fluid") within a layer and then provide new content on top of the blank textures, if applicable.

The document management system can also provide AR tools that allow the user to interact directly with the AR layer(s) instead of requiring the user to interact with the physical document. Specifically, if the user uses the AR tools to interact with the AR layer (e.g., to make one or more annotations to the AR layer on the physical document), the document management system can treat the annotations in the AR layer as annotations to the physical document and update the shared state mapping accordingly. In one or more embodiments, the document management system provides a one-to-one mapping between tools in the AR environment and tools in a client application for modifying the electronic document (e.g., the client application 302 of FIG. 3A). Thus, the user can draw, type, delete, or otherwise insert or modify annotations within the AR layer.

In one or more embodiments, the document management system also resolves conflicting differences using the AR environment. For instance, if the electronic document 304 includes an annotation that the physical document 308 does not include, and the physical document 308 includes an annotation that the electronic document 304 does not include in the same location as the annotation in the electronic document 304, the document management system can display the annotations together within the AR environment. Alternatively, the document management system can determine that either the electronic document 304 or the physical document 308 is a "master" document to use in the case of conflicting annotations. In particular, when creating the shared state mapping, the document management system can determine that an annotation from the master document overrides another annotation and then exclude the overridden annotation from the shared state mapping. The document management can update the document corresponding to the overridden annotation accordingly.

If the document management system stops detecting the physical document 308 within the field of view at any time, the document management system can stop displaying the AR layers for the physical document 308. Additionally, if the document management system detects the physical document 308 within the field of view again, the document management system can remap the physical document 308 to the electronic document 304 and then create a new shared state mapping. The document management system can also create new AR layers for displaying annotations on the physical document 308. Additionally, if the user corrects the physical document 308 to include physical markings that match one or more annotations from the AR layer(s), the document management system can update the shared state mapping and remove the annotations from the AR layers.

Figure 4:
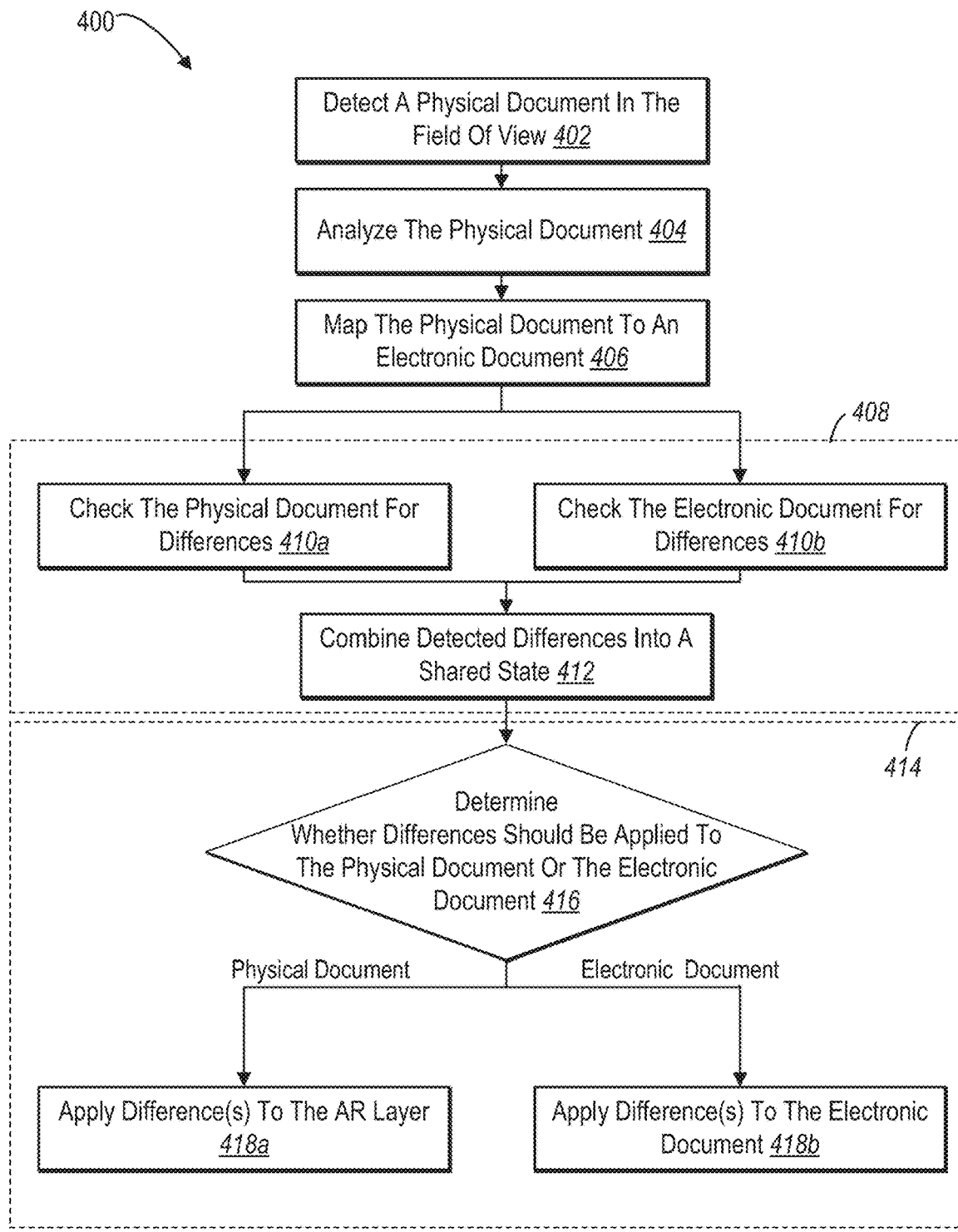
FIG. 4 illustrates a flowchart of an example method of leveraging augmented reality to integrate physical documents into a digital workflow in accordance with one or more embodiments.

FIG. 4 illustrates a state chart of an algorithm of leveraging augmented reality to integrate physical documents into a digital workflow. In particular, the document management system detects a physical document in the field of view 402 of an AR device. The document management system can use image processing techniques to monitor the input from an image capture device of the AR device to detect the presence of the physical document based on one or more corners, sides, or other boundaries of the physical document. Detecting the presence of the physical document in the field of view can trigger a process to synchronize the physical document with a corresponding electronic document.

Additionally, the document management system analyzes the physical document 404 to identify one or more visual features of the physical document. Specifically, the document management system analyzes the physical document by capturing an image snapshot (e.g., a bitmap) of the physical document and then using image processing techniques to identify the visual features of the physical document. The document management system can also use text recognition or other techniques for identifying visual features of the physical document. For example, the document management system can identify text, blocks of text, images, drawings, or other visually distinctive features that allow the document management system to uniquely identify the physical document.

After identifying the features of the physical document, the document management system maps the physical document to an electronic document 406. In particular, the document management system compares the identified feature(s) of the physical document to a database of features corresponding to a plurality of electronic documents. For instance, the document management system can first extract the features from electronic documents in a document repository and then compare the feature(s) from the physical document to the features in the database. Comparing the feature(s) from the physical document to the features in the database can include using image processing techniques.

The method 400 also includes a step 408 for creating a shared state mapping between the physical document and the electronic document. As described above with respect to FIGS. 2C and 3C, for example, the document management system determines whether there are any differences between the physical document and the electronic document. Specifically, the document management system checks the physical document for differences 410a. The document management system also checks the electronic document for differences 410b. In one or more embodiments, the document management system checks the physical document and the electronic document simultaneously. Alternatively, the document management system can check the physical document and the electronic document at different times (e.g., sequentially, such that the physical document is first and the electronic document second, or vice versa).

As described previously, the document management system determines whether the physical document includes any differences that are not included in the electronic document. For instance, the document management system can analyze the physical document to identify annotations in one or more locations of the physical document that do not match annotations in the electronic document. For example, the document management system can compare image snapshots of the physical document and the electronic document, such as using image processing techniques that include algorithms for comparing image pixels or regions of the image snapshots to determine whether the contents are the same. Additionally, the document management system can use character recognition to compare text in the image snapshots. If the document management system identifies any annotations that do not match annotations in the corresponding locations of the electronic document, the document management system determines that these annotations are differences that need to be synchronized.

The document management system also determines whether the electronic document includes any differences that are not included in the physical document. In particular, the document management system can analyze the image snapshots of the electronic document and the physical document to identify annotations in one or more locations of the electronic document that do not match annotations in the physical document. If the document management system identifies any annotations that do not match annotations in the corresponding locations of the physical document, the document management system determines that these annotations are also differences that need to be synchronized.

After determining the differences, the document management system combines detected differences into a shared state mapping 412. For instance, the shared state mapping contains all of the identified differences from the physical document and the electronic document. The shared state mapping can include a temporary file that the document management system creates in response to mapping the physical document to the electronic document. Additionally, the document management system can maintain the shared state mapping as long as the physical document remains in the field of view of the AR device.

In addition to storing the differences in the shared state mapping, the document management system can also store additional information in the shared state mapping. For example, in addition to the actual differences (e.g., the contents of the differences such as specific text or images), the document management system can identify location information for each of the differences. In one or more embodiments, the document management system stores the location information with the differences by combining the differences into an image file or document that includes the location information based on the relative distance between differences within the file. Alternatively, the document management system can store individual annotation elements that include metadata with the location information.

The shared state mapping can also include other information for each difference, such as the type of difference, a user that created the difference, a creation/modification timestamp for the difference, and whether the difference was identified in the electronic document or the physical document. As described in more detail below, the additional information allows the document management system to determine how to apply the differences to the electronic document and/or the physical document. Accordingly, the method 400 also includes a step 414 for applying the shared state mapping to the physical document or the electronic document. Specifically, the document management system synchronizes the differences across the different copies or versions of the document.

In one or more embodiments, the document management system determines whether differences should be applied to the physical document or the electronic document 416. In particular, the document management system can determine whether to apply a specific difference to the physical document or the electronic document based on whether a given difference is included in the corresponding physical/electronic document. According to one example, the document management system uses information in the shared state mapping to determine whether to apply a given difference to the physical document or the electronic document. To illustrate, if the shared state mapping indicates that a difference was identified in the physical document, the document management system can determine that the difference should be applied to the electronic document.

The document management system applies differences to the physical document by applying difference(s) to the AR layer 418*a* within the AR environment. For example, the document management system can generate a two-dimensional texture including all of the annotations to be applied to the physical document. The document management system can then locate the coordinates of the physical document within the AR environment and apply the two-dimensional texture to the physical document using the three-dimensional coordinates of the physical document in the AR environment. To illustrate, the document management system can locate one or more corners of the physical document and then apply the texture to the surface of the physical document to fit within the boundaries of the physical document. Additionally, the document management system can verify that the size of the texture is the correct size based on the contents of the physical document so that the differences appear in the correct locations. Alternatively, the document management system can apply the differences individually using three-dimensional coordinates of the AR environment.

The document management system also applies difference(s) to the electronic document 418*b*. Specifically, the document management system can apply differences to the electronic document based on the content. For example, if the difference is a text annotation to insert text into the electronic document (e.g., inserting text into a cell of a table as previously described), the document management system can insert the text into the electronic document at the corresponding location. To illustrate, the document management system can use character recognition to determine the text of one or more annotations and then insert the determined text into the electronic document.

Alternatively, the document management system can apply differences into the electronic document at the locations by inserting images directly into the electronic document. For example, the document management system can insert images representing text, drawings, shapes, or other annotations into the electronic document at the corresponding locations. The document management system can rearrange content in the electronic document, as applicable, to insert content, remove content, or change content within the electronic document.

Additionally, the document management system can interpret one or more predetermined annotation symbols as a request to perform a specific modification to the electronic document. To illustrate, the annotations can include proofreading or copy editing marks that indicate to the document management system to insert, delete, move, or otherwise modify content in the electronic document. As such, a user can insert an annotation including a predetermined annotation symbol at a specific location, and the document management system performs an operation to insert or modify content at the specific location based on a mapping of the operation to the predetermined annotation symbol.

Once the document management system has initialized the synchronization process between a physical document and an electronic document, the document management system can maintain the synchronization using the shared state mapping. Additionally, the document management system can apply any new differences to either the electronic document or the physical document while the shared state mapping exists. For example, as mentioned previously, the document management system can monitor the AR layer for new differences made to the AR layer using one or more AR tools, and apply the differences to the electronic document.

Accordingly, a user can interact with the physical document or the AR environment to update the electronic document. As previously mentioned, if the document management system stops detecting the presence of the physical document in the field of view of the AR device at any time for any reason, the document management system can stop the synchronization process. Similarly, if the physical document reenters the field of view, the document management system can remap the physical document to the electronic document and create a new shared state mapping.

FIGS. 1-4, the corresponding text, and the examples, provide a number of different systems and devices for incorporating physical documents and electronic documents into a review workflow. In addition to the foregoing, embodiments can be described in terms of flowcharts comprising acts and steps in a method for accomplishing a particular result. For example, FIG. 5 illustrates a flowchart of an exemplary method in accordance with one or more embodiments.

Figure 5:
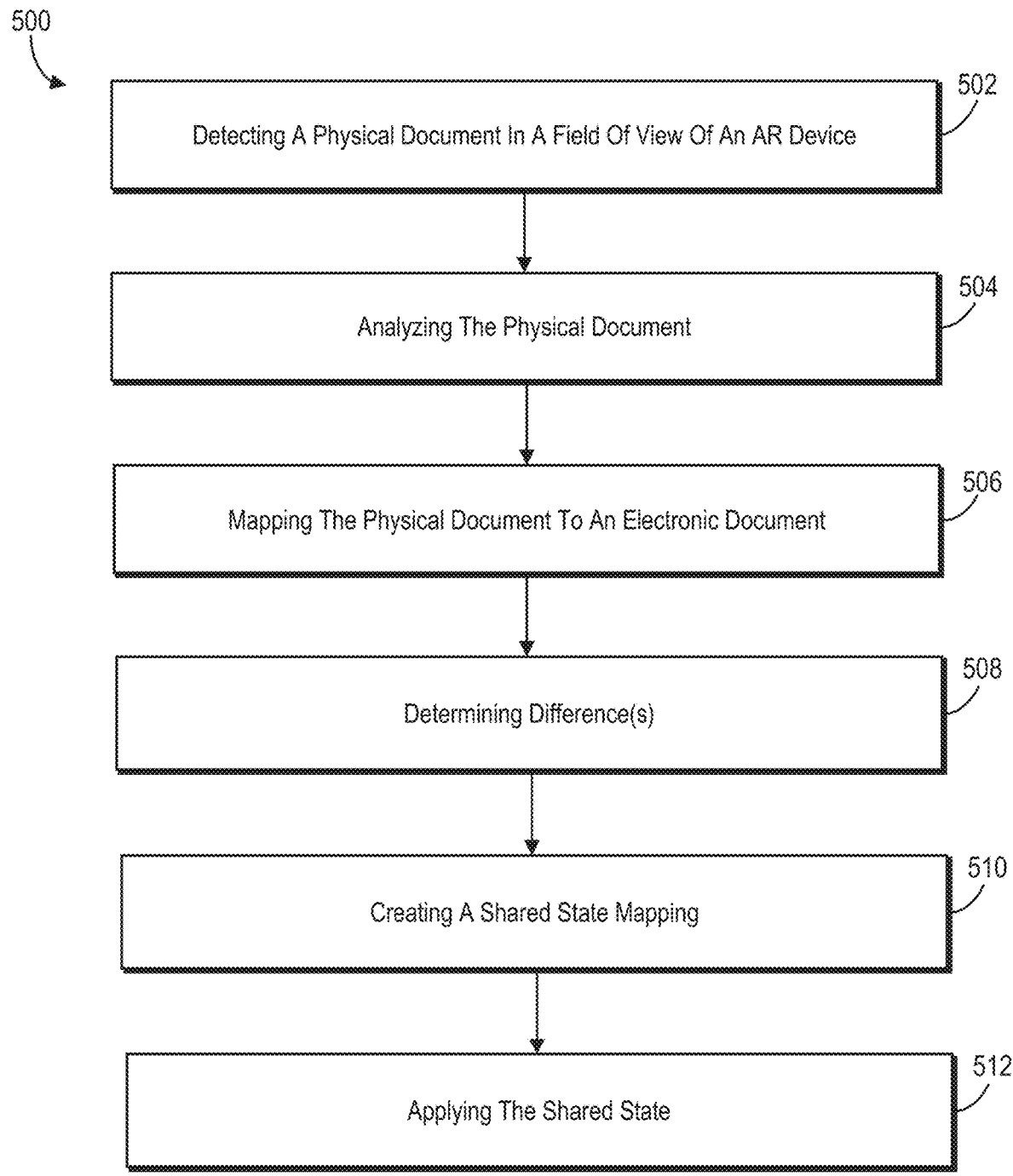
FIG. 5 illustrates a flowchart of a series of acts in a method of leveraging augmented reality to integrate physical documents into a digital workflow in accordance with one or more embodiments.

FIG. 5 illustrates a flowchart of a series of acts in a method 500 of leveraging augmented reality to integrate physical documents into a digital workflow. The method 500 includes an act 502 of detecting a physical document in a field of view of an AR device. For example, act 502 involves detecting a presence of a physical document within a field of view of the augmented reality device. Act 502 can involve detecting at least one corner or boundary of the physical document within the field of view of the AR device.

The method 500 also includes an act 504 of analyzing the physical document. For example, act 504 involves the physical document to identify at least one visual feature of the physical document. Act 504 an involve extracting an image of the physical document and using image processing techniques to identify the at least one visual feature of the physical document. The at least one visual feature can include text, a text region, an image, a drawing, or a shape.

Additionally, the method 500 includes an act 506 of mapping the physical document to an electronic document. For example, act 506 involves mapping, based on the at least one visual feature, the physical document to an electronic document from a document repository. Act 506 can also involve mapping the physical document to the electronic document from the document repository comprises determining that the physical document corresponds to a page from a plurality of pages of the electronic document. The method 500 can further include applying the shared state mapping to the electronic document comprises writing the at least one difference to the corresponding page of the electronic document.

Act 506 can involve accessing a local document repository comprising a plurality of electronic documents stored on the AR device. Act 506 can involve accessing a remote document repository comprising a plurality of electronic documents stored on at least one server device accessible via a network connection.

As part of act 506, or as an additional act, the method 500 can include analyzing a plurality of electronic documents in the document repository to identify a plurality of visual features for the plurality of electronic documents, storing the plurality of visual features for the plurality of electronic documents in a feature database, and identifying an electronic document that includes the at least one visual feature of the physical document by comparing the at least one visual feature of the physical document to the plurality of visual features in the feature database. For example, the method 500 can include converting each electronic document of the plurality of electronic documents to an image format, and analyzing each electronic document of the plurality of electronic documents in the image format to extract image objects corresponding to the plurality of visual features. Additionally, the method 500 can include determining, from the plurality of electronic documents, an electronic document that includes the at least one visual feature in a location of the electronic document corresponding to a location of the at least one visual feature within the physical document.

The method 500 further includes an act 508 of determining difference(s). For example, act 508 involves determining, using image processing, at least one difference between the physical document and the electronic document and in which of the physical document or the electronic document the at least one difference is found. In one or more embodiments, the at least one difference comprises a marking from a physical writing tool on the physical document. Act 508 can involve determining that the physical document includes one or more annotations that the electronic document does not include. Act 508 can also involve determining that the electronic document includes one or more annotations that the physical document does not include. For example, act 508 can involve creating image snapshots of the electronic document and the physical document and comparing the image snapshots to find one or more differences between the image snapshots.

As part of act 508, or as an additional act, the method 500 can include comparing the physical document to an unannotated version of the electronic document, and generating a first differences list comprising differences between the physical document and the unannotated version of the electronic document. Additionally, the method 500 can include comparing an annotated version of the electronic document to the unannotated version of the electronic document, and generating a second differences list comprising differences between the annotated version of the electronic document and the unannotated version of the electronic document. The method 500 can also include creating the shared state mapping based on the first differences list and the second differences list.

The method 500 also includes an act 510 of creating a shared state mapping. For example, act 510 involves creating, in response to determining the at least one difference, a shared state mapping for the physical document and the electronic document, the shared state mapping being a temporary digital file indicating whether the at least one difference was detected in the physical document or the electronic document. Act 510 can involve creating a temporary file that includes the at least one difference, the temporary file persisting while the physical document remains in the field of view of the AR device. Act 510 can also involve storing annotation information in the shared state mapping, wherein the annotation information includes the at least one difference and one or more of a creation or modification timestamp of the at least one difference, a location of the at least one difference, an originating document for the at least one difference, or a user identifier associated with a creation of the at least one difference.

Additionally, the method 500 includes an act 512 of applying the shared state. For example, act 512 involves applying the shared state mapping to the physical document or the electronic document by inserting the at least one difference in an augmented reality layer displayed over the physical document within the field of view of the augmented reality device or writing the at least one difference to the electronic document.

Act 512 can involve creating a two-dimensional texture comprising the at least one difference, and mapping the two-dimensional texture to the physical document in the augmented reality layer using coordinates of the physical document. Act 512 can also involve applying a plurality of augmented reality layers for a plurality of annotations to the physical document based on a plurality of characteristics of the plurality of annotations.

Act 512 can also involve writing the at least one difference to the electronic document as an image at a location corresponding to the at least one annotation. Alternatively, act 512 can involve writing the at least one difference to the electronic document by using character recognition to identify text in the at least one annotation, and inserting the identified text into the electronic document at a location corresponding to the at least one annotation.

Act 512 can involve determine that the at least one annotation comprises a predetermined annotation symbol mapped to a predetermined operation to modify content of the physical document or the electronic document, and perform, in response to determining that the at least one annotation comprises the predetermined annotation symbol, the predetermined operation to modify the content of the physical document or the electronic document.

The method 500 can also include detecting a new annotation to the physical document in addition to the at least one difference, updating the shared state mapping for the physical document and the electronic document with the new annotation, and applying the updated shared state mapping to the electronic document by storing the new annotation in the electronic document. Additionally, the method 500 can include detecting a new annotation to the electronic document in addition to the at least one difference, updating the shared state mapping for the physical document and the electronic document with the new annotation, and applying the updated shared state mapping to the physical document by writing the new annotation into the augmented reality layer displayed over the physical document within the field of view of the augmented reality device.

The method 500 can further include providing an augmented reality tool for interacting with the augmented reality layer, detecting a new annotation to the augmented reality layer in response to a user input using the augmented reality tool, updating the shared state mapping for the physical document and the electronic document with the new annotation, and applying the updated shared state mapping to the electronic document by storing the new annotation in the electronic document.

The method 500 can also include determining that the physical document leaves the field of view of the augmented reality device, detecting that the physical document reenters the field of view of the augmented reality device, and generating a new shared state mapping for the physical document and the electronic document comprising any differences that were created between the physical document leaving the field of view and then reentering the field of view.

Figure 6:
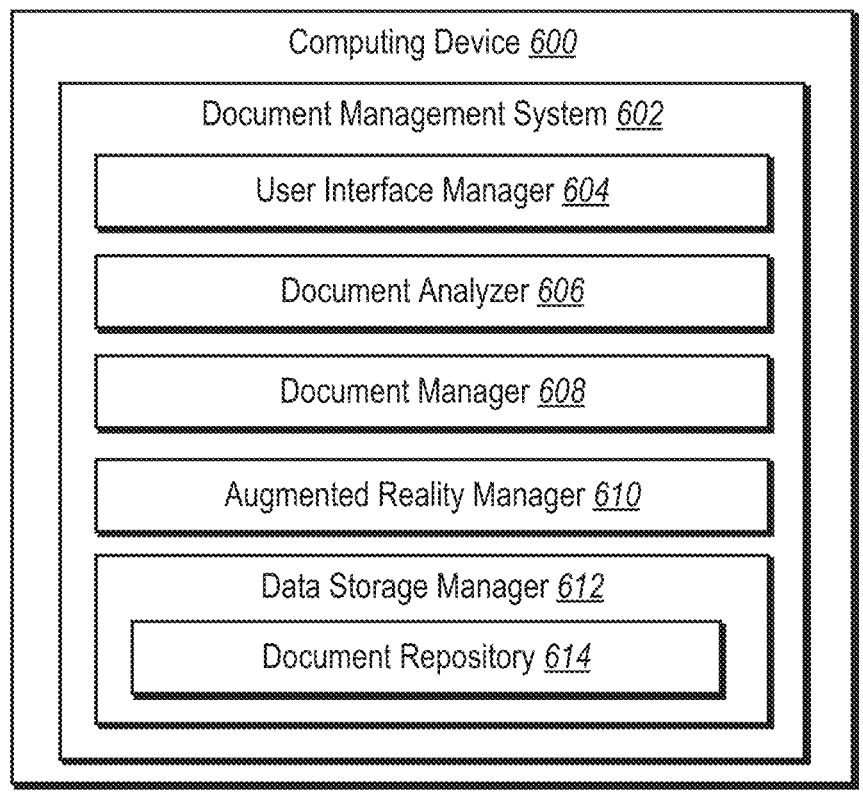
FIG. 6 illustrates a schematic diagram of a document management system in accordance with one or more embodiments.

FIG. 6 illustrates a schematic diagram illustrating a computing device 600 that includes a document management system 602. As illustrated by FIG. 6, the computing device 600 includes a plurality of components that perform at least some of the functions and methods described herein. The computing device 600 can include a personal computer, laptop computer, mobile device, mobile phone, tablet, special purpose computer, television, server device(s) or other computing device, including computing devices described below with regard to FIG. 7. Additionally, although FIG. 6 illustrates that the document management system 602 is operating on a single computing device 600, the document management system 602 may operate within a distributed environment, such that the document management system 602 can be stored and/or operate on a plurality of computing devices. Furthermore, one or more client devices may remotely access the document management system 602 to perform the document review processes described herein.

As illustrated in FIG. 6, the document management system 602 allows the computing device 600 to synchronize annotations across a plurality of versions or copies of a document, including electronic copies and physical copies. In one or more embodiments, the document management system 602 is associated with one or more applications that run on the computing device 600 to perform the operations of the document review process. In particular, the document management system 602 includes a user interface manager 604, a document analyzer 606, a document manager 608, an augmented reality manager 610, and a data storage manager 612. Although the components of the document management system 602 are shown to be separate in FIG. 6, any of the components may be combined into fewer components, such as into a single component, or divided into more components as may serve a particular implementation. Furthermore, at least some of the components of the document management system 602 may be implemented on other devices and/or with other systems.

The components of the document management system 602 can include software, hardware, or both. For example, the components of the document management system 602 (e.g., the components of the computing device 600) can include on or more instructions stored on a computer-readable storage medium and executed by processors of one or more computing devices such as the computing device 600. When executed by the one or more processors, the computer-executable instructions of the document management system 602 cause the computing devices to perform the document review processes described herein. Alternatively, the components of the document management system 602 comprise hardware, such as a special purpose processing device to perform specific functions associated with document review processes. Additionally, the components of the document management system 602 can comprise a combination of computer-executable instructions and hardware.

Furthermore, the components of the document management system 602 performing the functions described herein with respect to the document management system 602 may, for example, be implemented as part of a stand-alone application, as a module of an application, as part of a suite of applications, as a plug-in for applications including content creation applications, as a library function or functions that may be called by other applications, and/or as a cloud-computing model. Thus, the components of the document management system 602 may be implemented as part of a stand-alone application on a personal computing device or a mobile device. Alternatively, or additionally, the components of the document management system 602 may be implemented in any application that allows delivery of content to users (e.g., document sharing), as previously described.

As previously described, the document management system 602 includes a user interface manager 604. Specifically, the user interface manager 604 facilitates management and display of content in a GUI. The user interface manager 604 can determine which content to display and where to display the content in the GUI. For example, the user interface manager 604 manages a display of content that the user inputs, creates, or modifies, including electronic documents. To illustrate, the user interface manager 604 can provide tools for allowing a user to modify electronic documents by adding or removing content (e.g., annotations).

Additionally, the user interface manager 604 manages display of content that the document management system 602 creates or modifies. For instance, the user interface manager 604 can communicate with the augmented reality manager 610 to provide an AR environment that includes one or more AR layers for displaying annotations on top of a physical document within a GUI. The user interface manager 604 can also allow communicate with one or more of the other components of the document management system 602 to determine which content to display and/or when to update content displayed in the GUI. For example, the user interface manager 604 can detect physical documents within a field of view of an image capture device of the computing device 600.

The document management system 602 also includes a document analyzer 606 to facilitate the analysis of documents. For example, the document analyzer 606 can use image processing techniques to analyze physical documents and electronic documents. To illustrate, the document analyzer 606 can identify visual features of the documents for use in mapping documents together. The document analyzer 606 can also compare documents to determine whether mapped documents include any differences. The document analyzer 606 can also perform other document analysis operations, including character recognition, to compare documents and to determine locations of information within the documents.

The document management system 602 further includes a document manager 608 to manage documents. Specifically, the document manager 608 can communicate with the document repository 614 to manage existing electronic documents for one or more users. The document manager 608 can also manage user access to the electronic documents. To illustrate, the document manager 608 can provide users with access to shared documents. The document manager 608 can also manage the modification and storage of documents within the document repository 614. As such, the document manager 608 can modify electronic documents based on user input or based on shared state mappings, as described previously.

Additionally, the document management system 602 includes an augmented reality manager 610 that facilitates the display of information within an AR environment. To illustrate, the augmented reality manager 610 can determine information to display within one or more AR layers based on information stored in a shared state mapping for an electronic document and a physical document. Accordingly, the augmented reality manager 610 can generate AR layers to include annotations to be displayed on top of the physical document within the AR environment. The augmented reality manager 610 can also manage information input using AR tools within the AR environment, such as to modify or insert annotations into AR layers.

The document management system 602 also includes a data storage manager 612 to store and maintain data on the computing device 600. In particular, the data storage manager 612 can communicate with the other components of the document management system 602 to store data associated with the document review processes described herein. The data storage manager 612 can also provide the data to one or more of the components in connection with the document review processes. For example, the data storage manager 612 can store information including, but not limited to, content that the user is creating/modifying, temporary files and annotation information.

Additionally, the data storage manager 612 can include a document repository 614 that includes electronic documents for one or more users to use in mapping to physical documents. The document repository 614 can store user access information (e.g., access rights) that allow one or more users to access the electronic documents of the document repository 614. The document repository 614 can also include a database of visual features extracted from the electronic documents in the document repository 614 for use in mapping the electronic documents to physical documents detected in the field of view of the computing device 600.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
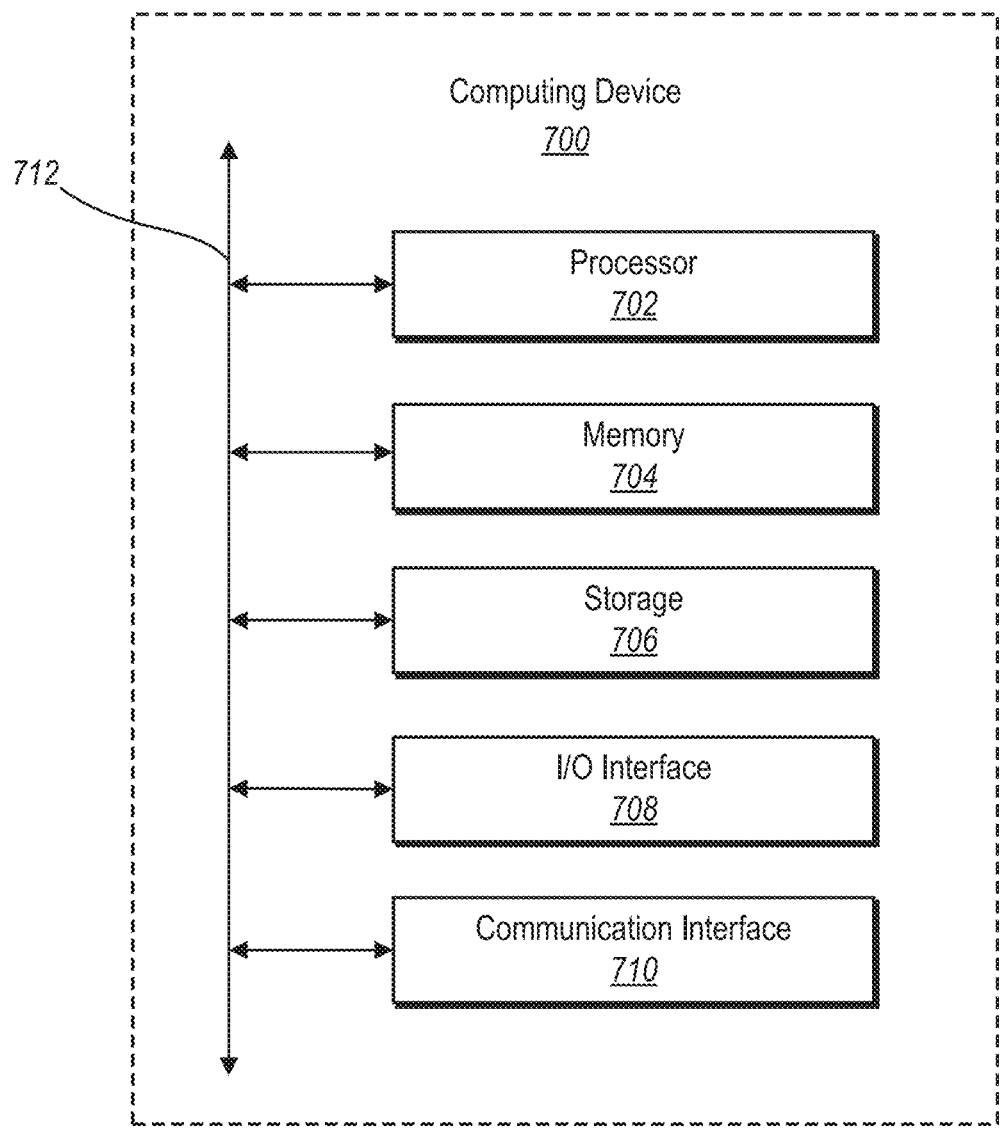
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the document management system 602. As shown by FIG. 7, the computing device 700 can comprise a processor 702, a memory 704, a storage device 706, an I/O interface 708, and a communication interface 710, which may be communicatively coupled by way of a communication infrastructure 712. In certain embodiments, the computing device 700 can include fewer or more components than those shown in FIG. 7. Components of the computing device 700 shown in FIG. 7 will now be described in additional detail.

In one or more embodiments, the processor 702 includes hardware for executing instructions, such as those making up a computer program. As an example, and not by way of limitation, to execute instructions for dynamically modifying workflows, the processor 702 may retrieve (or fetch) the instructions from an internal register, an internal cache, the memory 704, or the storage device 706 and decode and execute them. The memory 704 may be a volatile or non-volatile memory used for storing data, metadata, and programs for execution by the processor(s). The storage device 706 includes storage, such as a hard disk, flash disk drive, or other digital storage device, for storing data or instructions for performing the methods described herein.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example, and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 710 may facilitate communications with various types of wired or wireless networks. The communication interface 710 may also facilitate communications using various communication protocols. The communication infrastructure 712 may also include hardware, software, or both that couples components of the computing device 700 to each other. For example, the communication interface 710 may use one or more networks and/or protocols to enable a plurality of computing devices connected by a particular infrastructure to communicate with each other to perform one or more aspects of the processes described herein. To illustrate, the document review process can allow a plurality of devices (e.g., a client device and server devices) to exchange information using various communication networks and protocols for sharing information such as electronic documents, annotations, and other document review information.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital media environment for shared document synchronization, a computer-implemented method of leveraging augmented reality to integrate physical documents into a digital workflow, comprising:

detecting, by at least one processor of an augmented reality device, a presence of a physical document within a field of view of the augmented reality device;

analyzing, by the at least one processor, the physical document to identify at least one visual feature of the physical document;

mapping, by the at least one processor and based on the at least one visual feature, the physical document to an electronic document from a document repository;

determining, by the at least one processor using image processing, a plurality of differences between the physical document and the electronic document, wherein the physical document comprises a first difference of the plurality of differences and the electronic document comprises a second difference of the plurality of differences;

creating, by the at least one processor in response to determining the plurality of differences, a shared state mapping for the physical document and the electronic document, the shared state mapping being a temporary digital file indicating the plurality of differences between the physical document and the electronic document; and applying, by the at least one processor, the shared state mapping to the physical document and the electronic document by writing the first difference to the electronic document and inserting the second difference into an augmented reality layer displayed over the physical document within the field of view of the augmented reality device.

2. The computer-implemented method as recited in claim 1, further comprising:
analyzing a plurality of electronic documents in the document repository to identify a plurality of visual features for the plurality of electronic documents;
storing the plurality of visual features for the plurality of electronic documents in a feature database; and
identifying an electronic document that includes the at least one visual feature of the physical document by comparing the at least one visual feature of the physical document to the plurality of visual features in the feature database.

3. The computer-implemented method as recited in claim 2, wherein identifying the electronic document that includes the at least one visual feature of the physical document further comprises determining, from the plurality of electronic documents, an electronic document that includes the at least one visual feature in a location of the electronic document corresponding to a location of the at least one visual feature within the physical document.

4. The computer-implemented method as recited in claim 2, wherein analyzing the plurality of electronic documents in the document repository to identify the plurality of visual features for the plurality of electronic documents comprises:
converting each electronic document of the plurality of electronic documents to an image format; and
analyzing each electronic document of the plurality of electronic documents in the image format to extract image objects corresponding to the plurality of visual features.

5. The computer-implemented method as recited in claim 1, wherein applying the shared state mapping to the physical document by inserting the second difference into the augmented reality layer displayed over the physical document within the field of view of the augmented reality device comprises:
creating a two-dimensional texture comprising the second difference; and
mapping the two-dimensional texture to the physical document in the augmented reality layer using coordinates of the physical document.

6. The computer-implemented method as recited in claim 1, further comprising:
detecting a new annotation to the physical document in addition to the first difference;
updating the shared state mapping for the physical document and the electronic document with the new annotation; and
applying the updated shared state mapping to the electronic document by writing the new annotation to the electronic document.

7. The computer-implemented method as recited in claim 1, further comprising:
detecting a new annotation to the electronic document in addition to the second difference;
updating the shared state mapping for the physical document and the electronic document with the new annotation; and
applying the updated shared state mapping to the physical document by inserting the new annotation into the augmented reality layer displayed over the physical document within the field of view of the augmented reality device.

8. The computer-implemented method as recited in claim 1, further comprising:
providing an augmented reality tool for interacting with the augmented reality layer;
detecting a new annotation to the augmented reality layer in response to a user input using the augmented reality tool;
updating the shared state mapping for the physical document and the electronic document with the new annotation; and
applying the updated shared state mapping to the electronic document by writing the new annotation to the electronic document.

9. The computer-implemented method as recited in claim 1, further comprising:
determining that the physical document leaves the field of view of the augmented reality device;
detecting that the physical document re-enters the field of view of the augmented reality device; and
generating a new shared state mapping for the physical document and the electronic document comprising any differences that were created between the physical document leaving the field of view and then reentering the field of view.

10. The computer-implemented method as recited in claim 1, further comprising:
comparing the physical document to an unannotated version of the electronic document;
generating a first differences list comprising differences between the physical document and the unannotated version of the electronic document;
comparing an annotated version of the electronic document to the unannotated version of the electronic document;
generating a second differences list comprising differences between the annotated version of the electronic document and the unannotated version of the electronic document; and
creating the shared state mapping based on the first differences list and the second differences list.

11. The computer-implemented method as recited in claim 1, wherein:
mapping the physical document to the electronic document from the document repository comprises determining that the physical document corresponds to a page from a plurality of pages of the electronic document; and
applying the shared state mapping to the electronic document comprises writing the first difference to the corresponding page of the electronic document.

12. In a digital media environment for shared document synchronization, a system for leveraging augmented reality to integrate physical documents into a digital workflow, the system comprising:
a non-transitory computer memory comprising a document repository comprising electronic documents; and
at least one computing device storing instructions thereon, that, when executed by the at least one computing device, cause the system to:
detect a presence of a physical document within a field of view of an augmented reality device;
map the physical document to an electronic document from the document repository based on a similarity of the physical document to the electronic document;
determine, using image processing, a plurality of differences between the physical document and the electronic document, wherein the physical document comprises a first difference of the plurality of differences and the electronic document comprises a second difference of the plurality of differences;

create a shared state mapping for the physical document and the electronic document, the shared state mapping being a temporary digital file indicating the plurality of differences between the physical document and the electronic document;

apply the shared state mapping to the physical document and the electronic document by writing the first difference to the electronic document and inserting the second difference into an augmented reality layer displayed over the physical document within the field of view of the augmented reality device; and synchronize the shared state mapping, comprising:
monitoring the physical document and the electronic document for one or more additional differences; and
storing the one or more additional differences in the shared state mapping.

13. The system as recited in claim 12, further comprising instructions that, when executed by the at least one computing device, cause the system to:
monitor the augmented reality layer for an augmented reality difference using an augmented reality tool; and
store the augmented reality difference in the shared state mapping.

14. The system as recited in claim 12, further comprising instructions that, when executed by the at least one computing device, cause the system to:
analyze a plurality of electronic documents in the document repository to identify a plurality of visual features for the plurality of electronic documents;
store the plurality of visual features for the plurality of electronic documents in a feature database; and
identify an electronic document that includes the plurality of visual features of the physical document according to a layout of the physical document by comparing the plurality of visual features of the physical document to the plurality of visual features in the feature database.

15. The system as recited in claim 12, further comprising instructions that, when executed by the at least one computing device, cause the system to apply the shared state mapping to the physical document by inserting the second difference into the augmented reality layer displayed over the physical document within the field of the augmented reality device, the applying comprising:
creating a two-dimensional texture comprising the second difference; and
mapping the two-dimensional texture to the physical document in the augmented reality layer using coordinates of the physical document.

16. The system as recited in claim 12, further comprising instructions that, when executed by the at least one computing device, cause the system to:
detect a new annotation to the physical document, the electronic document, or the augmented reality layer in addition to the plurality of differences;
update the shared state mapping for the physical document and the electronic document with the new annotation; and apply the updated shared state mapping comprising the new annotation to the physical document or the electronic document.

17. The system as recited in claim 12, further comprising instructions that, when executed by the at least one computing device, cause the system to:
determine that at least one difference of the plurality of differences comprises a predetermined annotation symbol mapped to a predetermined operation to modify content of the physical document or the electronic document; and
perform, in response to determining that the at least one difference comprises the predetermined annotation symbol, the predetermined operation to modify the content of the physical document or the electronic document.

18. In a digital media environment for shared document synchronization, a computer-implemented method of leveraging augmented reality to integrate physical documents into a digital workflow, comprising:
detecting, by at least one processor of an augmented reality device, a presence of a physical document within a field of view of the augmented reality device;
analyzing, by the at least one processor, the physical document to identify at least one visual feature of the physical document;
mapping, by the at least one processor and based on the at least one visual feature, the physical document to an electronic document from a document repository;
a step for creating a shared state mapping indicating a plurality of differences between the physical document and the electronic document, wherein the shared state mapping comprises a first difference from the physical document and a second difference from the electronic document; and
a step for applying the shared state mapping to the physical document and the electronic document.

19. The computer-implemented method as recited in claim 18, further comprising:
analyzing a plurality of electronic documents in the document repository to identify a plurality of visual features for the plurality of electronic documents;
storing the plurality of visual features for the plurality of electronic documents in a feature database; and
identifying an electronic document that includes the at least one visual feature of the physical document by comparing the at least one visual feature of the physical document to the plurality of visual features in the feature database.

20. The computer-implemented method as recited in claim 18, further comprising:
detecting a new annotation to the physical document, the electronic document, or an augmented reality layer; and
updating the shared state mapping between the physical document and the electronic document with the new annotation for applying to the physical document or the electronic document.

* * * * *